US009867226B2

(12) United States Patent
Kubota et al.

(10) Patent No.: US 9,867,226 B2
(45) Date of Patent: Jan. 9, 2018

(54) RADIO LINK FAILURE (RLF) FAILOVER IN A MULTI-CONNECTIVITY ENVIRONMENT

(71) Applicant: QUALCOMM Incorporated, San Diego, CA (US)

(72) Inventors: Keiichi Kubota, San Diego, CA (US); Gavin Bernard Horn, La Jolla, CA (US); Luis F. B. Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/140,465

(22) Filed: Apr. 27, 2016

(65) Prior Publication Data

US 2017/0171903 A1    Jun. 15, 2017

Related U.S. Application Data

(60) Provisional application No. 62/267,150, filed on Dec. 14, 2015.

(51) Int. Cl.
*H04W 76/02* (2009.01)
*H04L 12/24* (2006.01)
(Continued)

(52) U.S. Cl.
CPC ....... *H04W 76/027* (2013.01); *H04L 41/0672* (2013.01); *H04W 24/04* (2013.01);
(Continued)

(58) Field of Classification Search
CPC ... H04W 76/027; H04W 24/04; H04W 36/04; H04W 48/16; H04W 76/046; H04W 36/165; H04W 76/028; H04L 41/0672
See application file for complete search history.

(56) References Cited

U.S. PATENT DOCUMENTS

2009/0213730 A1    8/2009 Zeng et al.
2012/0110393 A1    5/2012 Shieh et al.
(Continued)

FOREIGN PATENT DOCUMENTS

EP    2244411 A2    10/2010
EP    2919505 A1    9/2015
WO    WO-2015020584 A2    2/2015

OTHER PUBLICATIONS

International Search Report and Written Opinion—PCT/US2016/063829—ISA/EPO—Feb. 22, 2017.

*Primary Examiner* — Chuong A Ngo
(74) *Attorney, Agent, or Firm* — Patterson & Sheridan, L.L.P.

(57) ABSTRACT

Certain aspects of the present disclosure relate to methods and apparatus for wireless communication, and more particularly, to methods and apparatus for radio link failure (RLF) failover in a multi-connectivity environment. For example, in certain aspects, a mobile device for establishing one or more first data flows with a first network entity, determining a link recovery configuration, the link recovery configuration having information related to establishing a second data flow in the event of a link failure at the first network entity, wherein the link recovery configuration comprises a list of network entities, detecting a link failure at the first network entity affecting a service associated with the first data flows, and recovering the service associated with the first data flows from the link failure by selecting a second network entity from the list of network entities and establishing the second data flow associated with the service based on the link recovery configuration.

41 Claims, 24 Drawing Sheets

(51) Int. Cl.
*H04W 24/04* (2009.01)
*H04W 36/04* (2009.01)
*H04W 36/16* (2009.01)
*H04W 48/16* (2009.01)
*H04W 76/04* (2009.01)
*H04W 36/30* (2009.01)
*H04W 36/00* (2009.01)

(52) U.S. Cl.
CPC ......... *H04W 36/04* (2013.01); *H04W 36/165* (2013.01); *H04W 36/30* (2013.01); *H04W 48/16* (2013.01); *H04W 76/028* (2013.01); *H04W 76/046* (2013.01); *H04W 36/0011* (2013.01); *H04W 76/025* (2013.01); *H04W 76/026* (2013.01)

(56) References Cited

U.S. PATENT DOCUMENTS

| | | | |
|---|---|---|---|
| 2013/0182563 | A1 | 7/2013 | Johansson et al. |
| 2014/0064065 | A1 | 3/2014 | Rogers et al. |
| 2014/0119175 | A1 | 5/2014 | Velde et al. |
| 2014/0321267 | A1 | 10/2014 | Jiang et al. |
| 2015/0045035 | A1 | 2/2015 | Nigam et al. |
| 2015/0049707 | A1 | 2/2015 | Vajapeyam et al. |
| 2015/0117183 | A1 | 4/2015 | Heo et al. |
| 2015/0264738 | A1* | 9/2015 | Lee .................... H04W 76/027 370/228 |

* cited by examiner

RADIO LINK FAILURE (RLF) FAILOVER IN A MULTI-CONNECTIVITY ENVIRONMENT

CLAIM OF PRIORITY UNDER 35 U.S.C. §119

The present application for patent claims benefit of U.S. Provisional Patent Application Ser. No. 62/267,150, filed Dec. 14, 2015 and assigned to the assignee hereof and hereby expressly incorporated by reference herein.

FIELD

The present disclosure relates generally to wireless communication, and more particularly, to methods and apparatus for radio link failure (RLF) failover in a multi-connectivity environment.

BACKGROUND

Wireless communication systems are being developed with the goal of enabling new services and devices, which will offer new user experiences. One approach to achieve this is to leverage multiple existing radio access technologies (RATs), for example, using a combination of features from wireless wide area networks (e.g., 3G and LTE) and wireless local area networks (e.g., based on WiFi and millimeter wave (mmW)). Dual connectivity (DC) operation enables a wireless device to utilize multiple radio resources provided by multiple distinct schedulers located in more than one access node connected via non-ideal backhaul over the X2 interface.

One challenge with a system that utilizes dual connectivity is how to handle radio link failure failover on the multiple radio resources.

SUMMARY

Certain aspects of the present disclosure provide a method of wireless communication by a mobile device. The method generally includes establishing one or more first data flows with a first network entity, wherein the link recovery configuration comprises a list of network entities, determining a link recovery configuration, the link recovery configuration having information related to establishing a second data flow in the event of a link failure at the first network entity, detecting a link failure at the first network affecting a service associated with the first data flows, and recovering the service associated with the first data flows from the link failure by selecting a second network entity from the list of network entities and establishing the second data flow associated with the service based on the link recovery configuration.

Certain aspects of the present disclosure provide a method of wireless communication by a network entity. The method generally includes establishing a first data flow with a mobile device, determining a link recovery configuration, the link recovery configuration having information related to establishing a second data flow in the event of a link failure affecting a service associated with the first data flow, wherein the link recovery configuration comprises a list of network entities, detecting a link failure affecting the first data flow, and taking action to initiate recovery from the link failure based on the link recovery configuration.

Certain aspects of the present disclosure provide a method of wireless communication by a network entity. The method generally includes determining a link recovery configuration, the link recovery configuration having information related to recovery, by a mobile device, from a link failure affecting a service associated with a first data flow established with the mobile device, wherein the link recovery configuration comprises a list of network entities, and taking action to configure the mobile device according to the link recovery configuration.

Aspects also provide various apparatus, systems, computer program products, and processing systems for performing the operations described above.

DETAILED DESCRIPTION

Figure 1:
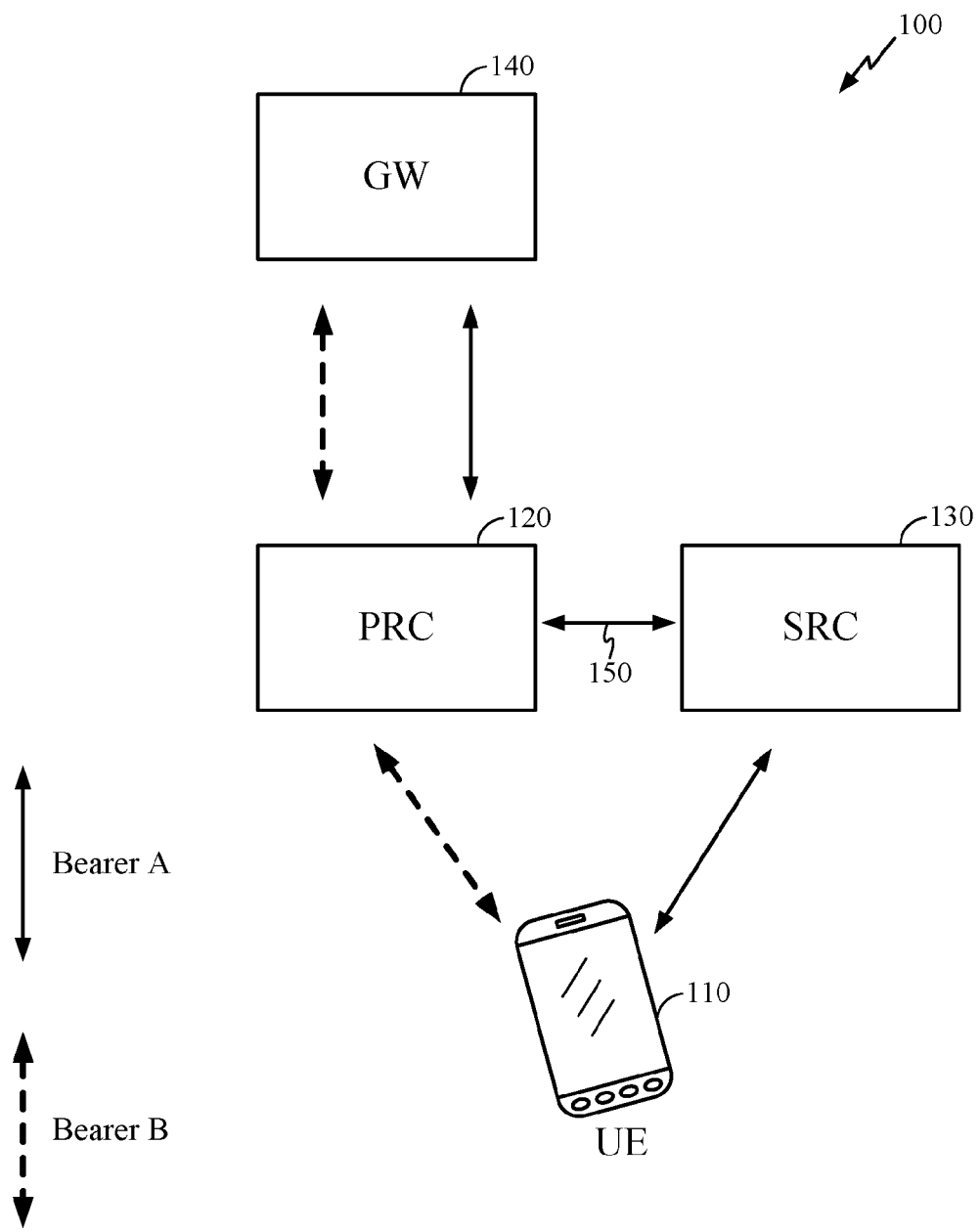
FIG. 1 illustrates an example wireless environment, in accordance with certain aspects of the present disclosure.

Where an RRC connection is established to more than one access node (AN) concurrently, if a RLF to a primary radio connection (PRC) occurs, a service may failover and be recovered by another radio connection. That is, where multi-connectivity is implemented and a UE is connected for multiple access nodes (ANs), where a RLF is detected for one AN, the temporarily dropped flows associated with the AN experiencing RLF may be quickly reestablished on the other serving ANs previously serving other flows.

Aspects of the present disclosure provide techniques that may be used to route data between a core network and a user equipment (UE) connected via multiple access nodes (AN) and/or radio access technologies (RATs). In some cases, an entity making admission control or load balancing decisions (to routed data between the multiple RATs) may consider which particular services are activated.

Aspects of the present disclosure may be applied to a wide variety of different types of mobile devices communicating via a wide variety of different RATs. Different terminology may be used to refer to mobile devices. For example, in some cases depending on the RAT(s) supported thereby, a mobile device may be referred to as a wireless device, user terminal (UT), access terminal (AT), user equipment (UE), station, mobile station, wireless station, wireless node, or the like. Similarly, different terminology may be used to refer to a base station that provides services to a mobile device, such as access to a core network. For example, in some cases depending on the RAT(s) supported thereby, a base station may be referred to as an access point (AP), a node B, an access node (AN), an enhanced Node B (eNodeB), or simply an eNB.

In certain examples that follow, a mobile device is referred to as a UE and base station are referred to as eNBs or AN. Such references are not meant to limit aspects of the present disclosure to any particular RAT or RATs, but are merely to help describe illustrative examples meant to facilitate understanding.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory. CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

An Example Wireless Environment

FIG. 1 illustrates an example wireless environment 100, in which aspects of the present disclosure may be utilized to manage data flows between a core network and a wireless device, such as UE 110.

As illustrated, UE 110 may be capable of communicating with multiple base stations, such as a PRC 120 and a secondary radio connection (SRC) 130. PRC 120 and SRC 130 may communicate via the same RAT or different RATs. For example, PRC 120 may communicate via a wireless wide area network (WWAN) protocol (e.g. LTE) while SRC 130 may communicate via a wireless local area network (WLAN) protocol (e.g., WiFi).

As used herein, the term PRC generally refers to an AN that terminates an S1-MME (Mobility Management Entity) control plane for the UE, while the term SRC generally refers to an AN serving the UE that is not the PRC. An S connection may be used by the PRC or SRC to communicate with the core network (CN), for example via a CN gateway (GW) 140. For example, the S1 interface may include an S1-U interface, which serves the data plane between the PRC or SRC and the CN GW, and an S1-MME, which serves the control plane.

In certain aspects, the PRC may be connected to one or more SRCs to serve a UE via multi-connectivity. The PRC and SRC may communicate with one another via a backhaul connection 150 (e.g., an X2 connection). The backhaul connection need not be direct but may be routed through one or more intermediate nodes (e.g., an MME, an interworking gateway function, or a router). The number of SRCs may be limited, depending on the capabilities of the UE. The PRC may coordinate mobility and user-plane (U-plane) split procedures within the corresponding operator network. The PRC may be considered as "access agnostic," meaning it may support any type of RAT both to serve the UE and also for managing the UE configuration of a U-plane split with one or more SRCs. For example, a PRC may utilize a common U-plane anchored in the operator's core network (CN) in order to enable procedures to manage the U-plane split via multiple RATs.

The SRC may be utilized as a source of supplemental capacity for the PRC and may also use a different RAT (from the RAT of the PRC) to serve the UE. Having the SRC as a supplemental capacity for the PRC may provide an opportunistic and energy efficient operation, which may be initiated by the UE's user or the network operator.

The SRC may be loosely or tightly coupled with the PRC, depending on backhaul bandwidth capabilities and latency requirements. For example, a SRC that is considered tightly coupled with a PRC may have the SRC's connection to the UE substantially managed by the PRC. On the other hand, a SRC that is considered loosely coupled with a PRC may leave the SRC's connection to the UE under the control of the SRC subject to, for example, general requirements such as Quality of Service (QoS) from the PRC. For example, a SRC with a high-capacity and low-latency backhaul link to a PRC may be tightly coupled with the operations of the PRC. The SRC may be used as a supplemental downlink (SDL) or as an additional cell for both uplink (UL) and downlink (DL). In some cases, the SRC may be used to help achieve supplemental mobility robustness of the PRC, for example, for mission critical applications. For example, the SRC may provide a redundant path for delivery of critical information and may also provide a fast failover (to the SRC) in the event the PRC experiences a radio link failure (RLF).

Multi-connectivity (MC) generally refers to a mode of operation wherein a UE is connected (e.g., radio resource control (RRC) connected) to a PRC and at least one SRC, as illustrated in FIG. 1. FIG. 1 shows a specific example of MC, with two different ANs, that may be referred to as dual connectivity (DC). In MC, a group of serving cells associated with the PRC, including a primary cell (PCell) and optionally one or more secondary cells (SCells), may be referred to as a master cell group (MCG). Similarly, a group of serving cells associated with the SRC may be referred to as a secondary cell group (SCG).

Certain aspects of the present disclosure present MC procedures which include procedures to change (add to an SCG, remove from an SCG, or modify the configuration of) one or more cells of a SRC, while maintaining a current PRC. As will be described in greater detail below, MC procedures may include various options for offloading data communications using MC, for example, at the packet level, bearer level, or access packet network (APN) level.

MC procedures may also include handover procedures to change the PRC, e.g., by transferring the functionality of the PRC for a UE's MC configuration to another AN, as well as additional aggregation procedures. The aggregation procedures may include procedures to change (add, remove, or modify) a set of one or more secondary component carriers (SCC) of the PRC and/or a SRC. In some cases, aggregation may imply a primary component carrier (PCC) controlling one or more secondary component carrier (SCCs) with a common media access control (MAC) layer.

The present disclosure provides various options for aggregation and U-plane splitting, such as aggregation within a same node, (e.g., carrier aggregation) and U-plane splitting across nodes via the radio access network (RAN). For example, for multi-connectivity, a data flow may be split on a per-packet basis or split on a per-bearer basis (e.g., split over the X2 interface instead of the S1 interface).

In some cases, the U-plane may also be split across nodes via the CN, for example, via a bearer-split using multi-connectivity. That is, a CN sending data via multiple bearers e.g., Bearer A and Bearer B in FIG. 1, to a UE may use multi-connectivity to assign one bearer to a PRC and a second bearer to a SRC, and send data packets to the PRC and SRC based on which bearer each packet is traversing.

Another option for aggregation and U-plane splitting is non-seamless offload, which may include offloading to another operator (if allowed), for example, if session continuity is not necessary. This may be considered equivalent to per-packet splitting if multi-path transmission control protocol (MP-TCP) is available, otherwise the split may occur at the Internet protocol (IP) flow level. Another option is multi-casting (e.g., bi-casting) traffic wherein, for example, each packet is served by both the PRC and SRC for greater reliability.

In some cases, per-packet U-plane splitting performance may be optimized to support multiple access links across RATs with different latencies and link error rates. Similarly, per-packet U-plane splitting performance may be optimized across licensed, shared, and/or unlicensed bands, and for cells sharing the same carrier and/or for cells on separate carriers.

Example Protocol Stack Configurations for Aggregation and User Plane Splitting

Figure 2A:
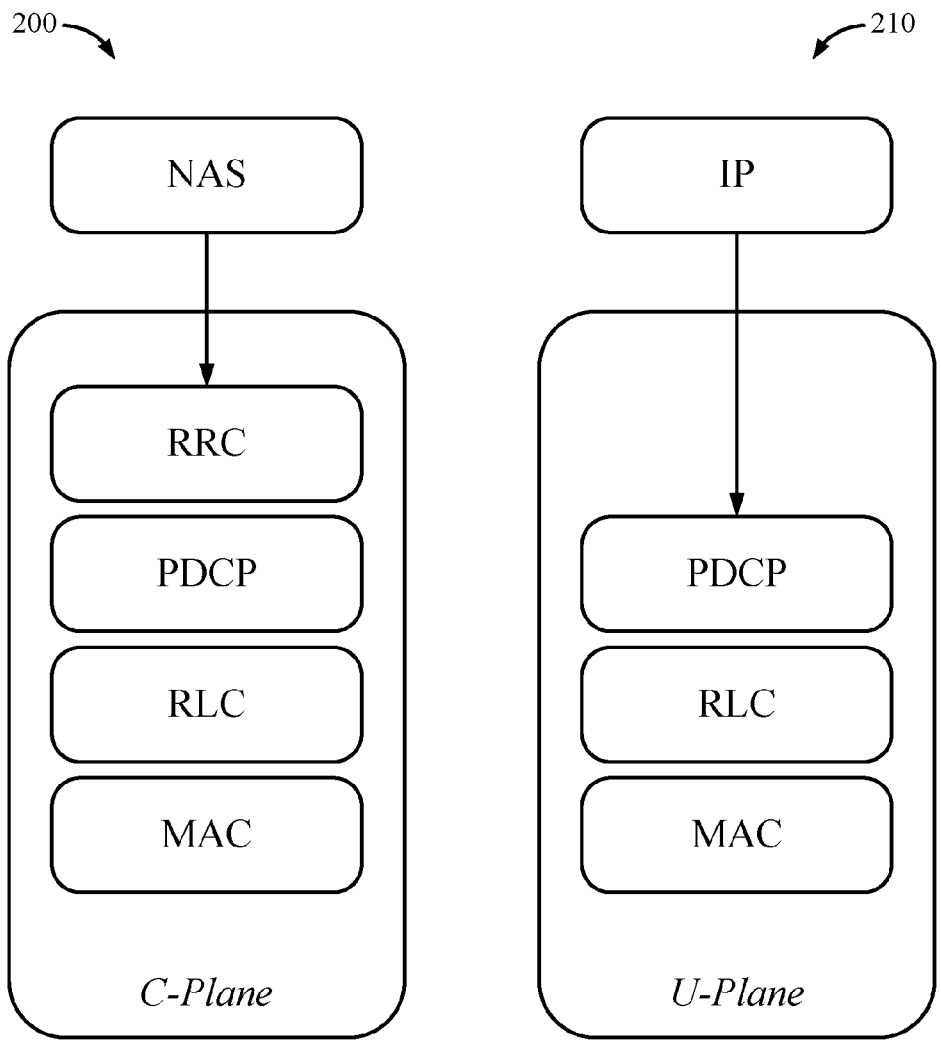
FIGS. 2A and 2B illustrate example protocol layers for control plane and user plane routing, in accordance with certain aspects of the present disclosure.

Different options for U-plane splitting may be described with reference to wireless communication protocol stacks, such as the Long Term Evolution (LTE) C-plane stack 200 and U-plane stack 210 shown in FIG. 2A. In the C-plane, a non-access stratum (NAS) message is received by the radio resource control (RRC) layer and is passed down to the packet data convergence protocol (PDCP) layer, radio link control (RLC) layer and media access control (MAC) layer. In the U-plane, an IP packet is received by the PDCP layer and passed down to the RLC layer and MAC layer.

As mentioned above, different levels of U-plane splitting are possible, with different corresponding considerations when making routing decisions. For example, for a per-bearer or per IP flow split, a decision of where to serve each IP packet may be based on a Traffic Flow Template (TFT) associated with the bearer or IP flow. In this case, a common PDCP layer or RLC layer may not be required between different serving nodes as there is no reordering issue between serving nodes, since all the IP packets for a flow are routed through the same serving node. That is, because the packets are routed based on which bearer or flow the packets belong to, all of the packets for any given flow arrive at the UE from one serving node, and the receiving UE can determine the correct order of the packets from indicators supplied by the node.

When packets of a flow arrive from multiple serving nodes, the indicators (e.g., sequence numbers) used by the nodes may conflict, and the receiving UE cannot determine the proper order of the packets. For example, in the case of a per-bearer or per-IP-flow split, the split may occur at a serving gateway (SGW) via an S1 interface (e.g., for MC) or at a packet data network gateway (PGW) or home agent (HA) (e.g., for WLAN interworking), resulting in packets for the bearer or IP flow being delivered to multiple serving nodes which may then assign their own indicators to the packets without coordination. For the UE to reassemble the packets in the correct order, some coordination or additional information must be provided. As an example, the node at which the split occurs may provide packet identifiers that determine a sequence of packets for the bearer, irrespective of the serving node that delivers a particular packet. A RAN-only solution may also be possible via an interface between serving nodes, e.g., an X2 interface.

For U-plane splitting on a per-packet basis, a common PDCP layer (for MC) across serving nodes may be utilized to reorder the packets in a flow, while RLC reordering may also be possible. In the case of U-plane splitting on a per-packet basis, the per-packet decision of where to serve each PDCP packet may be based on scheduling requirements (e.g., bandwidth available at transmission times) on each AN. According to certain aspects of the present disclosure, flow control may be defined between the PRC and SRC to allow the PRC and SRC to make the per-packet determinations of where to serve each PDCP packet.

In certain systems (e.g., current LTE), mobility and aggregation are generally based on the principle that a UE is served by a single serving AN on the C-plane, meaning that RRC and NAS signaling are only sent to the UE via a single AN. In some versions of these systems, a UE may also be served by up to 2 serving ANs on the U-plane, and by multiple (e.g., up to 5 in Release 12 of LTE) cells across the 2 serving ANs.

Figure 2B:
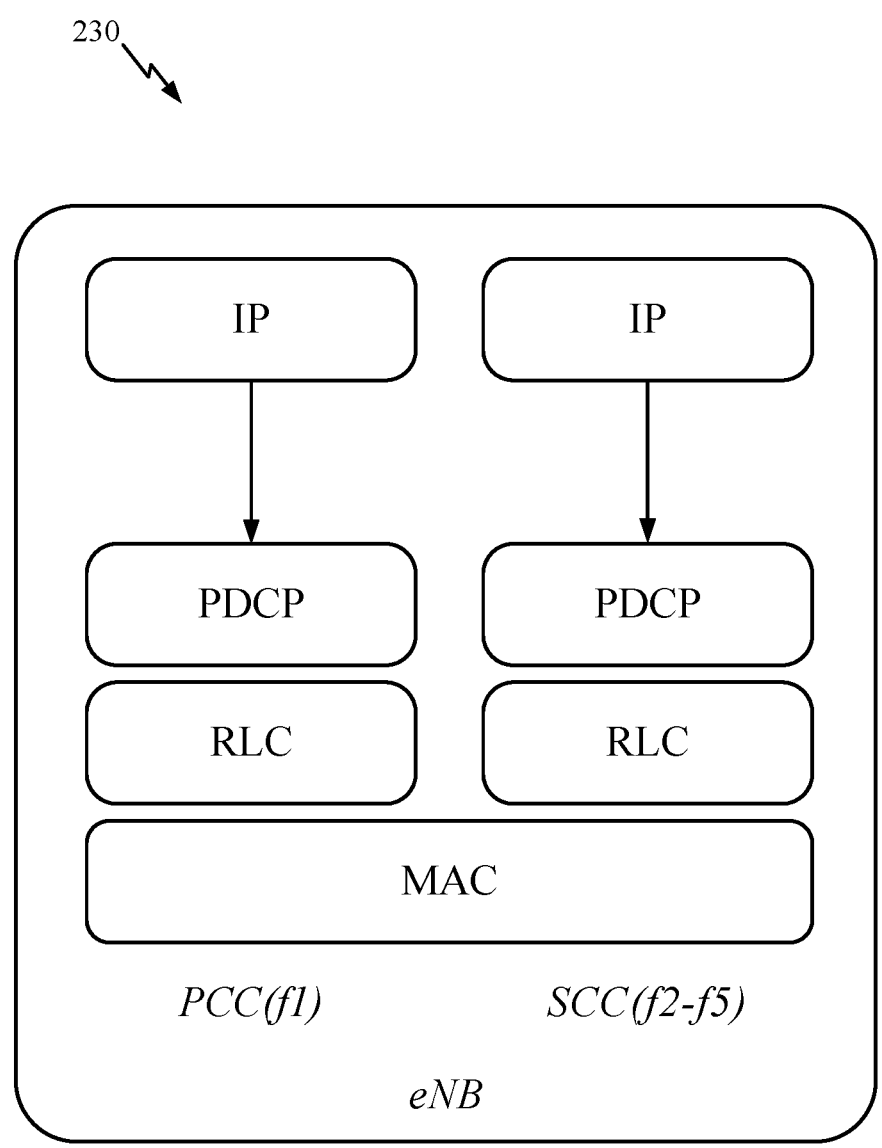

FIG. 2B illustrates an example configuration 230 of carrier aggregation for the U-plane protocol stack for an AN having a primary component carrier (PCC) f1 and secondary component carriers (SCCs) f2-f5 in current wireless communication systems (e.g., LTE Rel-10). In carrier aggregation (CA), reconfiguration, addition, and removal of secondary cells (SCells) within a single serving AN may be performed by the RRC function. The primary cell (PCell), belonging to the same AN, is used for transmission of physical uplink control channels (PUCCH), and NAS information is taken from the PCell. Cross-carrier scheduling, via a carrier indicator field (CIF), allows the physical downlink control channel (PDCCH) of a serving cell (e.g., the PCell) to schedule resources on another serving cell. Unlike SCells, it may not be possible to remove or deactivate a PCell.

A PCell serving a UE may be changed with a handover procedure (i.e. with a security key change and RACH procedure). For handover from one LTE PCell to another LTE PCell, RRC functions can also add, remove, or reconfigure SCells for usage with the target PCell. As a result, the UE may be able to handover (HO) to a target AN and continue CA without the re-establishing connections to SCells serving the UE. Re-establishment of connections by the UE is triggered when the PCell serving the UE experiences RLF, but not when SCells experience RLF. UEs operating in a CA system generally receive data faster due to the increased available bandwidth in a CA system than in a system without CA.

Figure 3:
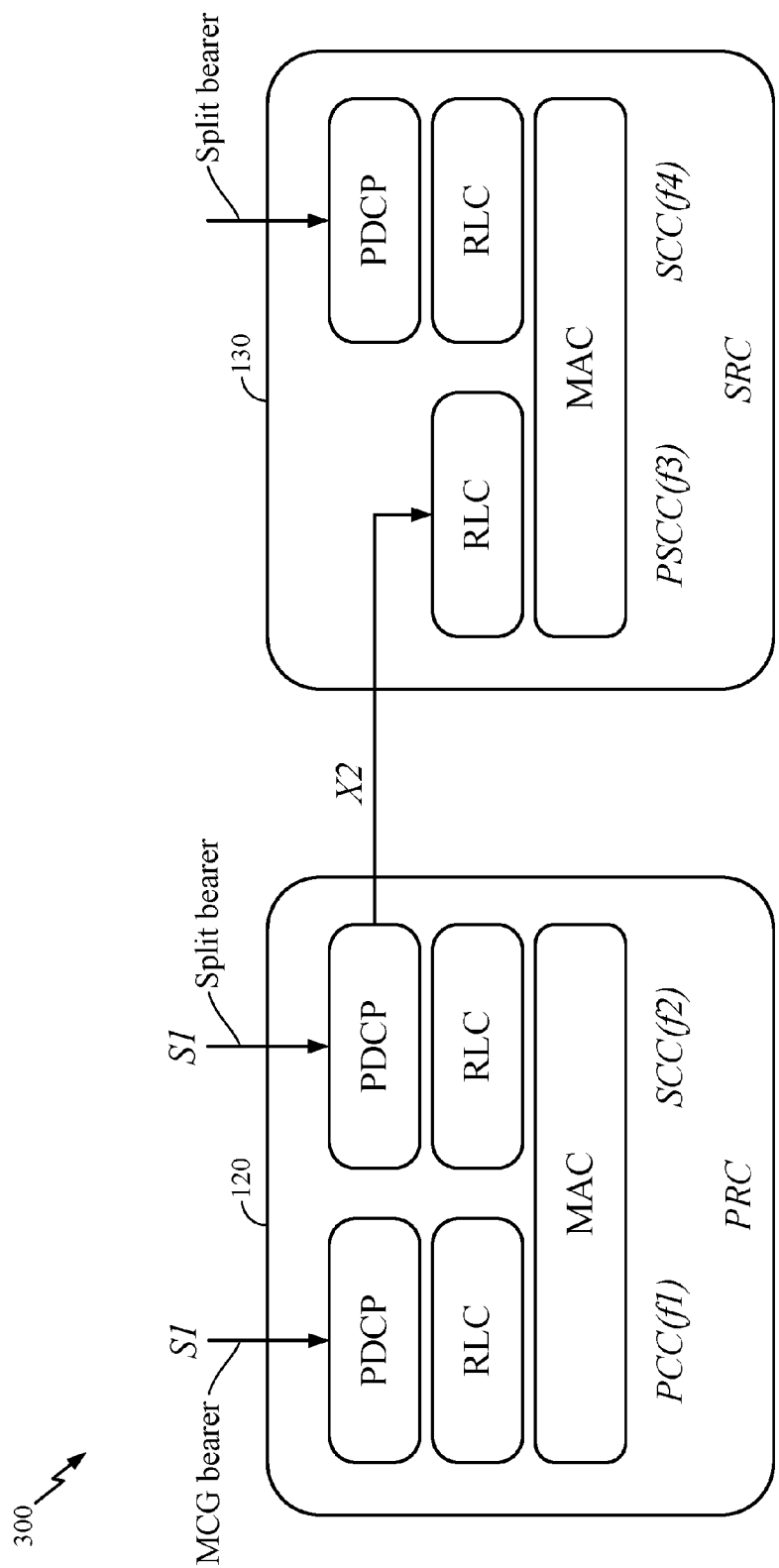
FIG. 3 illustrates an example multi-connectivity protocol stack, in accordance with aspects of the present disclosure.

FIG. 3 illustrates an example configuration 300 of a dual connectivity protocol stack linking (via an X2 connection) a PRC and a SRC. The protocol stack for a particular bearer generally depends on how that bearer is setup. For example, various alternative types of bearer exist: MCG bearers, split bearers, and SCG bearers. For MCG bearers (e.g., the left bearer in FIG. 3), the PRC is U-plane connected to the S-GW via an S1-U interface and the SRC is not involved in the transport of user plane data for this bearer. For split bearers (e.g., the middle bearer in FIG. 3), the PRC is U-plane connected to the S-GW via an S1-U interface and, in addition, the PRC and the SRC are interconnected via an X2-U interface, allowing both the PRC and the SRC to deliver U-plane data to the UE. For SCG bearers (e.g., the right bearer in FIG. 3), the SRC is directly connected with the S-GW via an S1-U interface.

Signaling radio bearers (SRB) are typically of the MCG bearer type and, therefore, use radio resources provided by the PRC. At least one cell in SCG typically has a configured UL RRC connection, and one of them is configured with PUCCH resources, which may be used for control procedures (e.g., data scheduling) that do not require the existence of an SRB. As noted above, re-establishment may be triggered when the PCell experiences RLF, but not when an SCell experiences RLF. The PRC maintains the radio resource management (RRM) measurement configuration of the UE and may decide to request a SRC to provide additional resources (serving cells) for a UE (e.g., based on received measurement reports or traffic conditions or bearer types). In this case, the PRC and the SRC may exchange information about UE configuration by means of RRC containers (inter-node messages) carried in X2 messages. In DC, two cell radio network temporary identifiers (C-RNTI) are typically independently allocated to a UE, one for use in communicating with the MCG, and one for use in communicating with the SCG.

Example Techniques for Radio Link Failure (RLF) Failover

In past 3GPP releases, DC configuration utilized a single RRC connection served by a PRC. Where a UE radio connection to a PRC experiences radio link failure (RLF) (e.g., drops), the RRC connection is lost and the UE can no longer communicate with the network and all services associated with the UE are dropped. The UE must then perform cell reselection in order to reconnect with the network, even if a SRC radio connection is still valid.

According to certain aspects of the present disclosure, an RRC connection may be established to more than one AN concurrently. Where multiple RRC connections are established, where a RLF to a PRC occurs, a service may failover and be recovered by another radio connection. That is, where multi-connectivity is implemented and a UE is connected to multiple ANs, if a RLF is detected for one AN, the temporarily dropped flows associated with the AN experiencing RLF may be quickly reestablished on the other serving ANs previously serving other flows. For example, for a UE connected to a PRC and a SRC when a PRC RLF is detected, the UE may perform a S1 or X2 fast failover or an autonomous path switch fast failover to the SRC and transfer all bearers to the SRC. As another example, where a UE is connected to a PRC and multiple SRCs, the UE may perform the fast failovers as in the previous example, or move some of the bearers to each of the SRCs and configure, as part of a bearer split, where to failover each bearer. Where a UE is connected only to a PRC and no SRCs are available, and the UE is not configured for fast failover, or the UE is configured such that it is forbidden to fast failover, the UE may perform an RRC connection reestablishment. Where a SRC RLF is detected, the UE may failover in a way similar to where a PRC RLF is detected.

As used herein, the term offload generally refers to the breaking out (i.e., offloading) of data at an earlier point in the path. For example, if data is routed from one path (e.g., through a PRC and a SRC) to a shorter path (e.g., through a SRC only). For example, a UE may be said to be operating with minimal offload for a flow, if all data is routed through a GW in the CN via a PRC. The UE may be said to be operating with local offload for a flow, if all data is routed through a SGW in the PRC while the UE may be said to be operating with maximum offload for the flow if all the data is routed through a SGW in the SRC and does not traverse the PRC.

As used herein, the term User plane (U-plane) splitting generally refers to how the traffic is delivered from the GW to the UE. As will be described in greater detail below, decisions regarding where to offload traffic and how to configure U-plane splitting may be based on the data service requirements and other considerations (e.g., available resources and radio frequency (RF) conditions of potential offload targets).

Figure 4:
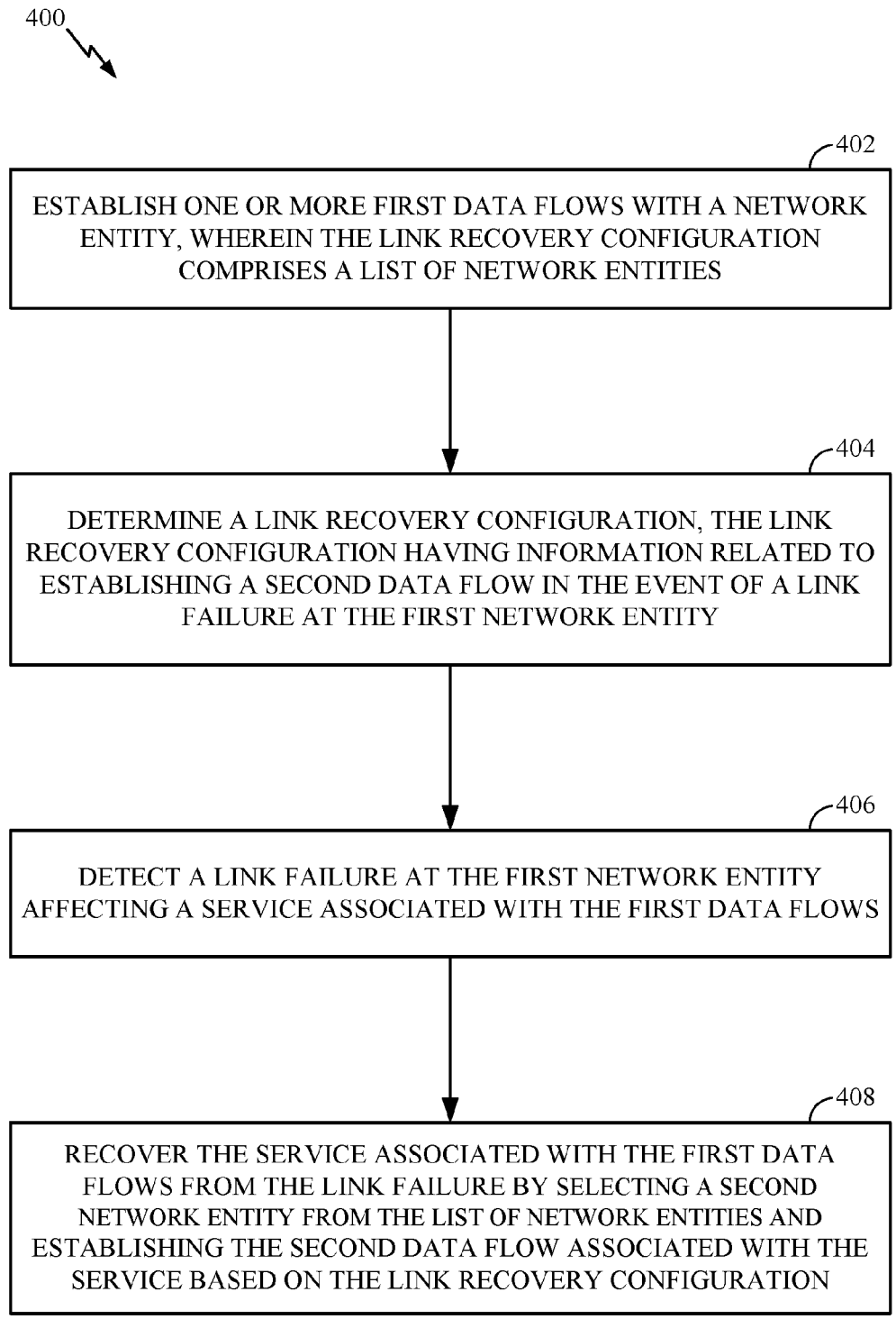
FIG. 4 illustrates example operations that may be performed by a wireless device for performing failover, in accordance with aspects of the present disclosure.

FIG. 4 illustrates example operations 400 that may be performed by a wireless device for performing failover, in accordance with aspects of the present disclosure. The operations 400 may begin, at 402 by establishing one or more first data flows with a first network entity. At 404, determining a link recovery configuration, the link recovery configuration having information related to establishing a second data flow in the event of a link failure at the first network entity. At 406, detecting a link failure at the first network entity affecting a service associated with the first data flows. At 408, recovering the service associated with the first data flows from the link failure by establishing the second data flow associated with the service based on the link recovery configuration.

Figure 5A:
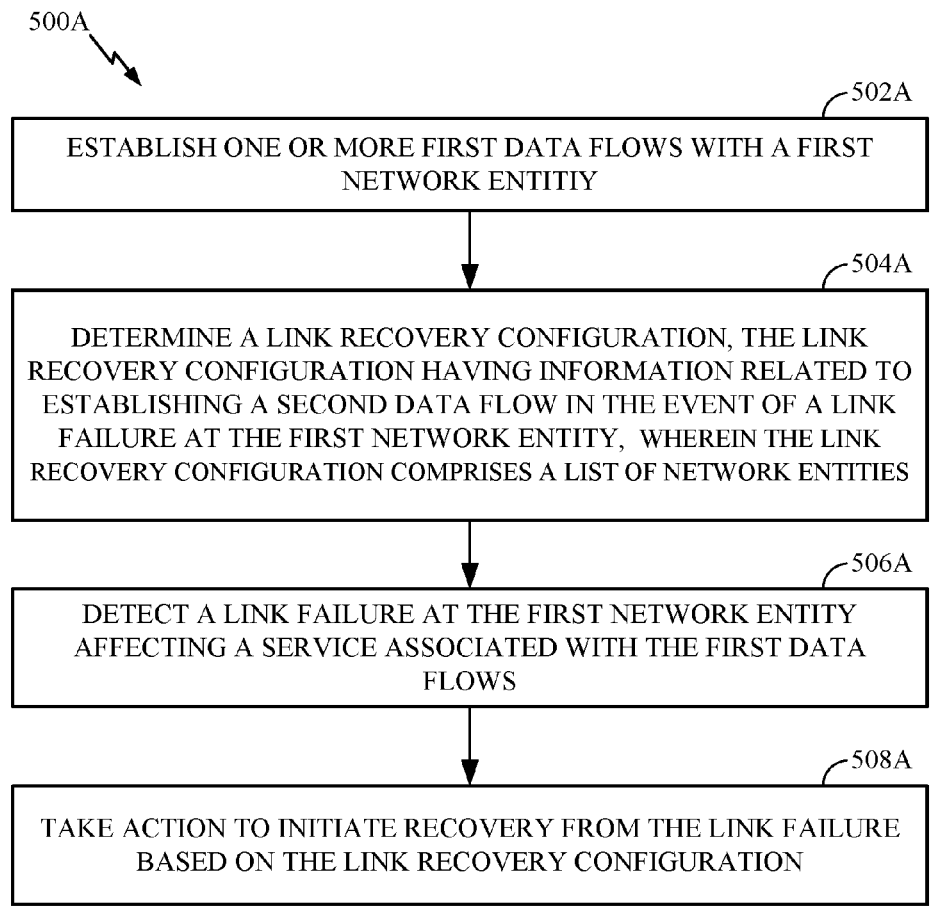
FIGS. 5A and 5B illustrate example operations that may be performed by a network entity for performing failover, in accordance with aspects of the present disclosure.

FIG. 5A illustrates example operations 500A that may be performed by a network entity for performing failover, in accordance with aspects of the present disclosure. At 502A, establishing a first data flow with a mobile device. At 504A, determining a link recovery configuration, the link recovery configuration having information related to establishing a second data flow in the event of a link failure affecting a service associated with the first data flow. At 506A, detecting a link failure affecting the first data flow. At 508A, taking action to initiate recovery from the link failure based on the link recovery configuration.

Figure 5B:
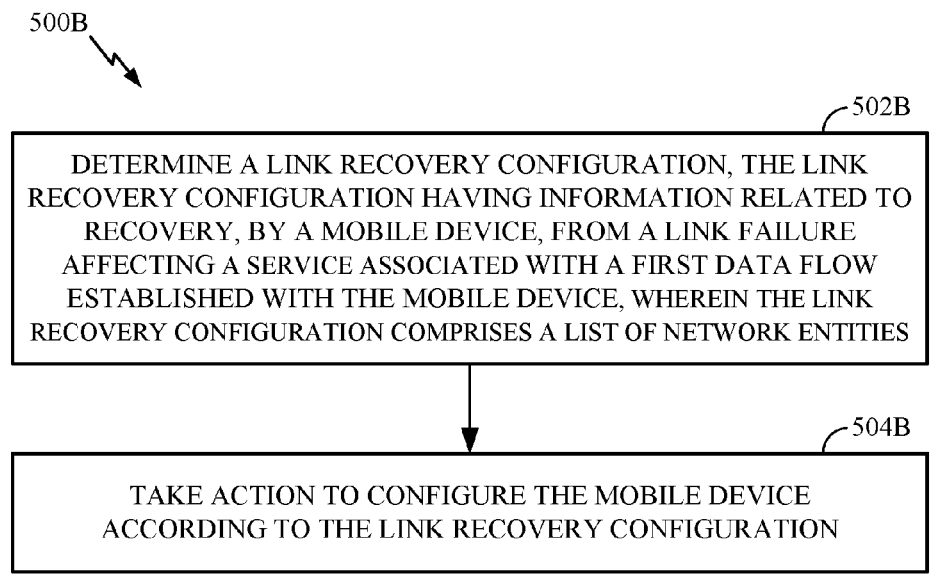

FIG. 5B illustrate example operations 500B that may be performed by a network entity for performing failover, in accordance with aspects of the present disclosure. At 502B, determining a link recovery configuration, the link recovery configuration having information related to recovery, by a mobile device, from a link failure affecting a service associated with a first data flow established with the mobile device. At 504B, taking action to configure the mobile device according to the link recovery configuration.

Figure 6:
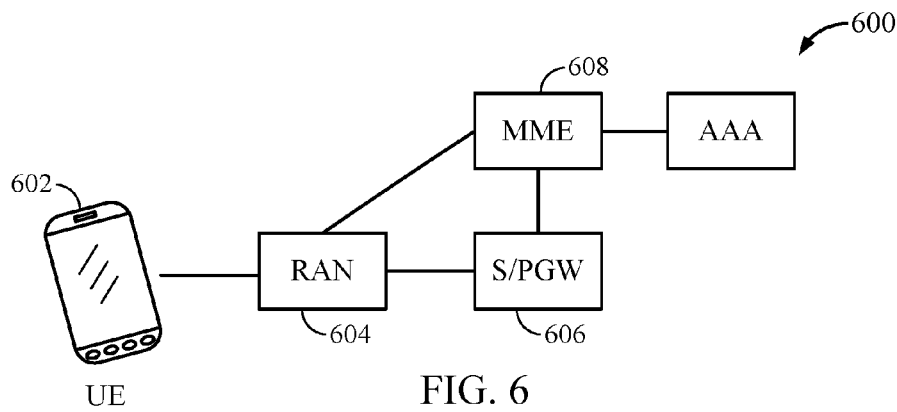
FIG. 6-8 illustrate reference network architectures, in accordance with aspects of the present disclosure.

FIG. 6 illustrates reference network architecture 600, according to certain aspects of the present disclosure. In a first reference network architecture, a UE 602 is connected to a single RAN 604 to a single MME cloud 608 with a single gateway 606. The UE 602 has a single MME context in the MME cloud 608 and as a UE performs handovers, the MME context remains the same. Handover within the same MME cloud may be handled using an X2 or S1 interface. Where a UE is connected to a single MME cloud, X2 based fast failover and autonomous path-switching fast failover may be implemented.

Figure 7:
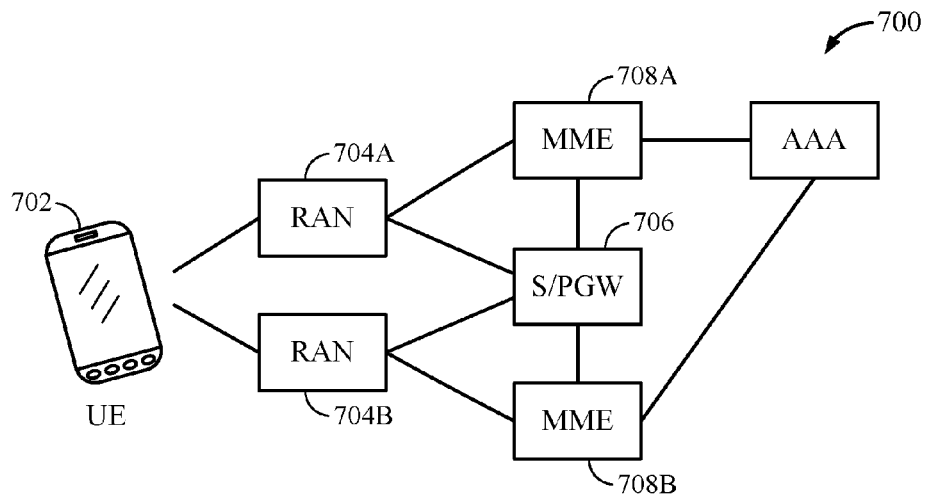

FIG. 7 illustrates reference network architecture 700, according to certain aspects of the present disclosure. In a second reference architecture, a UE 702 is connected to two RANs 704A, 704B, which share a common gateway 706, but is associated with two MME clouds 708A, 708B with relocation. As the UE moves between the two MME clouds, for example due to handover or multi-connectivity, a new context may be established in the target MME. In some cases, such as handover, the context associated with the UE in the source MME may be removed after handover is completed.

Figure 8:
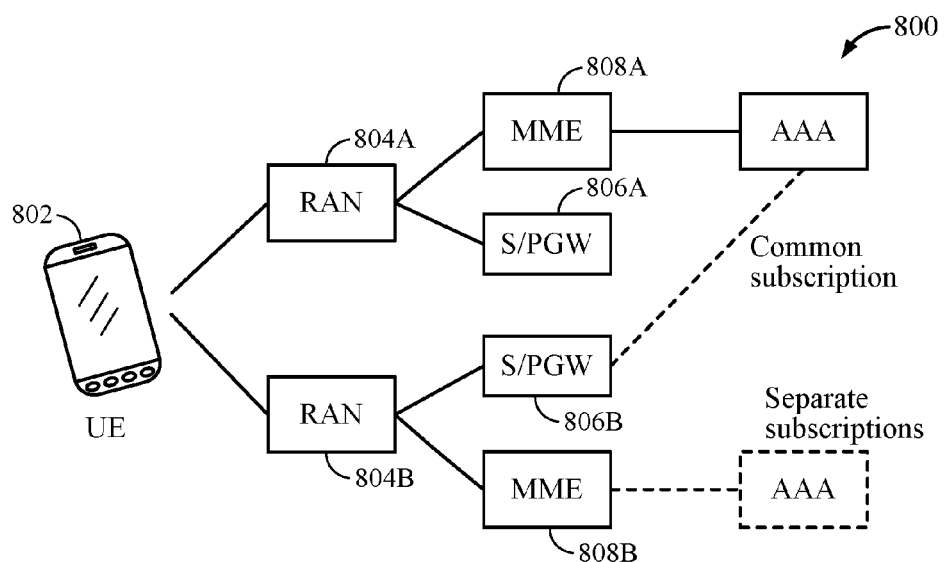

FIG. 8 illustrates reference network architecture 800, according to certain aspects of the present disclosure. In a third reference architecture, a UE 802 is connected to two RANs 804A, 804B. Each RAN 804A, 804B is in turn, connected to separate gateways 806A, 806B, and MME clouds 808A, 808B with MME relocation. Again, as the UE moves between the two MME clouds, for example due to handover or multi-connectivity, a new context may be established in the target MME and in some cases, such as handover, the context associated with the UE in the source MME may be removed after handover is completed. With separate gateways 806A, 806B, selected IP traffic offload (SIPTO) may be configured within an operator (or across operators in the case of inter-operator MC and offload) and the UE establishes a new IP address at the target MME cloud when moving between MME clouds. In the case of inter-operator MC, the UE may utilize separate subscriptions for each operator, or may be roaming.

Where a UE is connected to a more than one MME cloud, such as in network architectures 700 and 800, an S1 based fast failover may be implemented.

Figure 9:
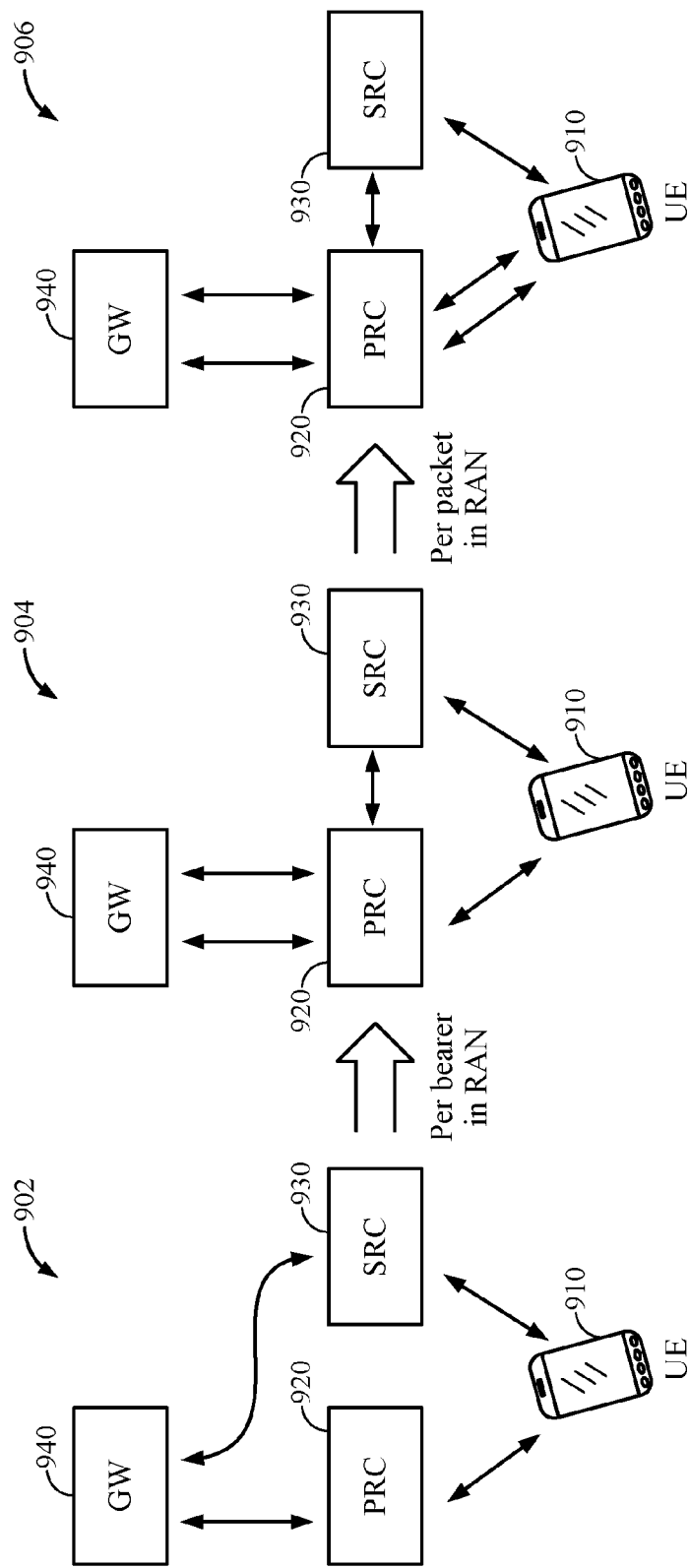
FIG. 9 illustrates three example U-plane splitting options, in accordance with aspects of the present disclosure.

FIG. 9 illustrates three example U-plane splitting configuration options, in accordance with aspects of the present disclosure. U-plane splitting configurations generally define how and where bearers are served by the network and UE 910 for seamless connectivity. Decisions regarding whether U-plane data is split on a per-packet basis (packet splitting) or a per-bearer basis (bearer splitting) may be based on coupling between the PRC 920 and SRC 930. In addition, the decisions may be a function of UE capability and backhaul availability.

As illustrated, in a first configuration 902, U-plane data may be routed to or from the gateway 940 and the core network via the SRC 930 and PRC 920, as the UE 910 has more than one independent RRC connection. This is an example of bearer (flow) splitting in the core network and the multi-homed/multi-IP flow scenarios are the typical use-case in this configuration. In the first configuration 902, the SRC 930 has an RRC connection to the UE and does not need to know anything about the flows serviced by the PRC 920. Where one of the ANs experiences RLF, flow information may be transferred and the RRC connections merged from the AN experiencing RLF to the other ANs after failover. As the flow information needs to be transferred, a context fetch fast failover mechanism may be implemented for this configuration, such as X2 based fast failover, where the context is transferred.

A second configuration 904 shows per-bearer U-plane splitting (or bearer, or flow, splitting) in the RAN. In this second configuration 904, packets are routed based on which bearer (flow) each packet is associated with by the core network and by the RAN in configuration 904.

A third configuration 906 shows per-packet U-plane splitting in the RAN. As illustrated, in this configuration, some packets for a bearer (flow) are served by the PRC while other packets are served by the SRC.

Where flow splitting is implemented, such as for the second and third configurations 904, 906, where a SRC is configured with a split bearer or flow, the SRC is informed about the PRC configuration for UE configuration coordination and has information related to the bearers or flows established on the PRC. As the SRC has flow information related to the PRC, autonomous path-switching fast failover mechanism may be implemented in addition to context fetch fast failover, such as X2 based fast failover, for these configurations.

In certain aspects of the present disclosure, fast failover may be configured, based on the services in use, how to perform a failover procedure. This configuration may be indicated, for example, via a fast failover configuration parameter in each E-UTRAN Radio Access Bearer (E-RAB) indicating how to perform a failover procedure for the bearer. In deploying fast failover, operators will want to configure fast failover to prevent UEs from possibly selecting ANs as fast-failover target ANs that may not support the same type of services as the AN experiencing RLF or may be better served by other ANs. For example, a UE may be operating in a MC configuration where a voice over LTE (VoLTE) radio access bearer (RAB) is served by a macro cell and background packet data served by a small cell. In such a scenario, a network operator may want to configure fast failover such that detecting a RLF for the macro cell does not result in failover to the small cell as the small cell may not support VoLTE or the UE may be better served by another macro cell.

According to aspects of the present disclosure, fast failover may be configured for a UE, for example, such that if the associated E-RAB is dropped due to RLF, the UE may perform a fast failover with another cell or AN in a particular manner, such as via X2/S1 failover initiated by either the UE or network. A fast failover configuration may also contain a list of cells or ANs to use for fail over. This list of cells may indicate to the UE the cells or ANs nearby or to which the UE is connected to for use for fail over. The UE may, in certain configurations, select a cell or AN having the best quality from the list and failover towards the selected cell or AN.

According to aspects of the present disclosure, fast failover may be configured to include a target cell, AN, or radio connection, along with pre-configuration information to use with the target cell, AN, or radio connection. This pre-configuration may include, for example, pre-configured parameters such as a logical channel group (LCG) to use with the service associated with a particular E-RAB, which the UE may use to access to the target cell or AN, or via the target radio connection after a RLF with the dropped E-RAB.

According to aspects of the present disclosure, failover may be configured to include frequency or RAT information such that after an E-RAB is dropped due to RLF a UE may perform a cell search based on the configured frequencies or RAT information. The UE may then perform an RRC connection reestablishment procedure on cells or ANs found on the configured frequencies or RATs. If no appropriate cells or ANs are found, the UE may then perform a legacy RRC connection reestablishment.

Figure 10A:
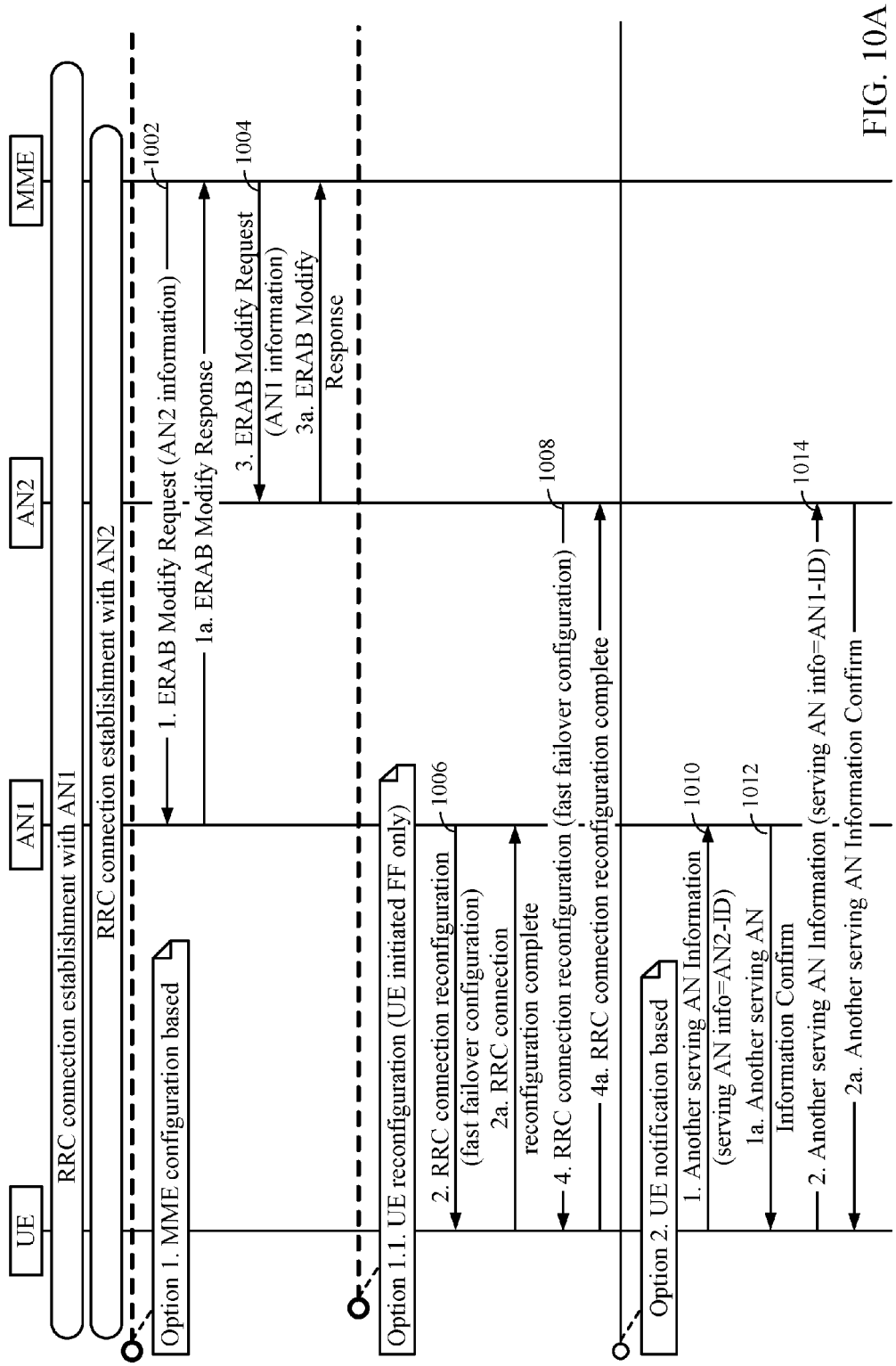
FIGS. 10A and 10B illustrate example fast failover configuration call flows, in accordance with aspects of the present disclosure.
Figure 10B:
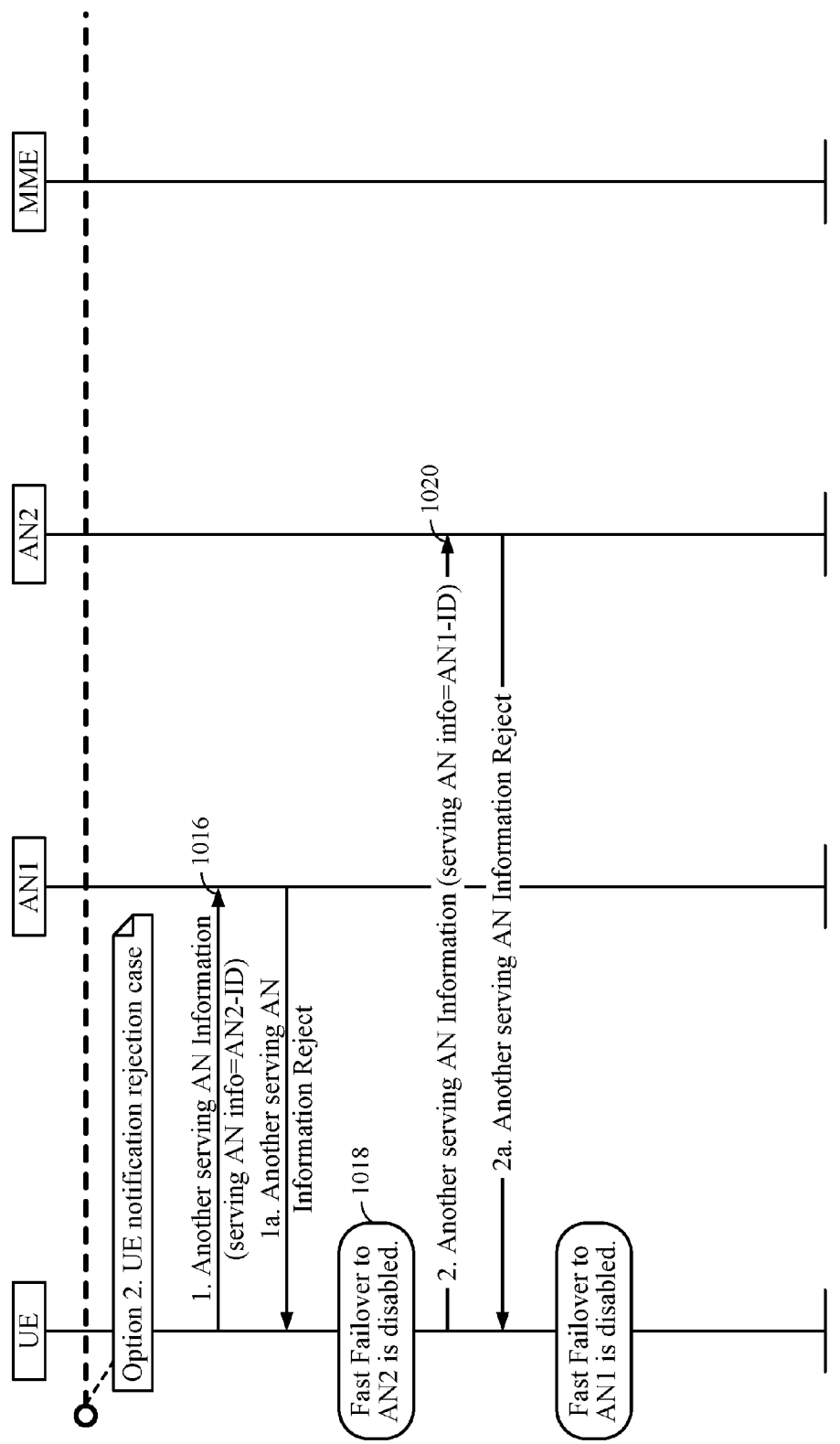

FIG. 10 illustrates example fast failover configuration call flows, in accordance with aspects of the present disclosure. A MME based configuration, Option 1, may be initiated after a UE establishes a RRC connection with two or more ANs. At 1002, the MME indicates to a first serving AN AN1, information related to the other serving AN(s) AN2. This information, for example, may include a global identifier of the other serving AN(s) AN2 and may be included in a S1 E-RAB modification request. The first serving AN may respond with a S1 E-RAB modification response. At 1004, the MME indicates to the other serving AN(s) AN2 information related to the first serving AN AN1, and this step may be repeated for any additional serving AN(s). At 1006, the first serving AN AN1 may configure the UE for fast failover by, for example, an RRC connection reconfiguration message, if the AN expects the UE to perform a UE initiated fast failover. At 1008, other serving AN(s) AN2 may also configure the UE for fast failover in a similar manner.

In the case of UE notification based fast failover configuration, Option 2, after RRC connection establishment, at 1010, the UE notifies a first serving AN AN1, via a fast failover serving AN notification, information related to the other serving AN(s) AN2. This information, for example, may include a global identifier of the other serving ANs. At 1012, if the first AN AN1 supports fast failover towards the other serving AN(s) AN2, the first AN AN1 acknowledges the fast failover serving AN notification. This notification and acknowledgment may be repeated for other serving AN(s) AN2 at 1014 and this step may be repeated for any additional serving AN(s).

At 1016, if the first serving AN AN1 does not support fast failover toward the notified other AN(s) AN2, the first serving AN responds to the fast failover serving AN notification with a reject message. The UE, at 1018, may then disable fast failover towards the notified other serving AN(s) AN2. This notification and rejection may be repeated for other serving AN(s) AN2 at 1020. Where fast failover is not available, the UE may perform an RRC connection reestablishment without fast failover or a context fetch RRC connection reestablishment.

Forward handover or context fetch handover, implemented as a part of Rel-12 HetNet mobility enhancements, mitigated RRC connection re-establishment failure by allowing a target AN to fetch the UE context from the source AN using the X2 interface. Elements of forward handover may be incorporated as a part of multi-connectivity fast failover procedure.

For example, in a UE initiated fast failover procedure, a UE may be multi-connectively connected to two or more ANs via independent RRC connections. The UE may initiate fast failover when the UE detects a RLF as to a first (source) AN. The UE may then declare the detected RLF to the network using a RRC connection to a second (target) AN. The second AN may then fetch the UE context from the first AN via an X2 interface.

As another example, in a network (NW) initiated fast failover procedure, where a UE may be multi-connectively connected to two or more ANs via independent RRC connections, a first (source) AN may detect an RLF with the UE. The first AN may then initiate a fast failover procedure by sending the UE context to the second (target) AN via an X2 interface.

Figure 11A:
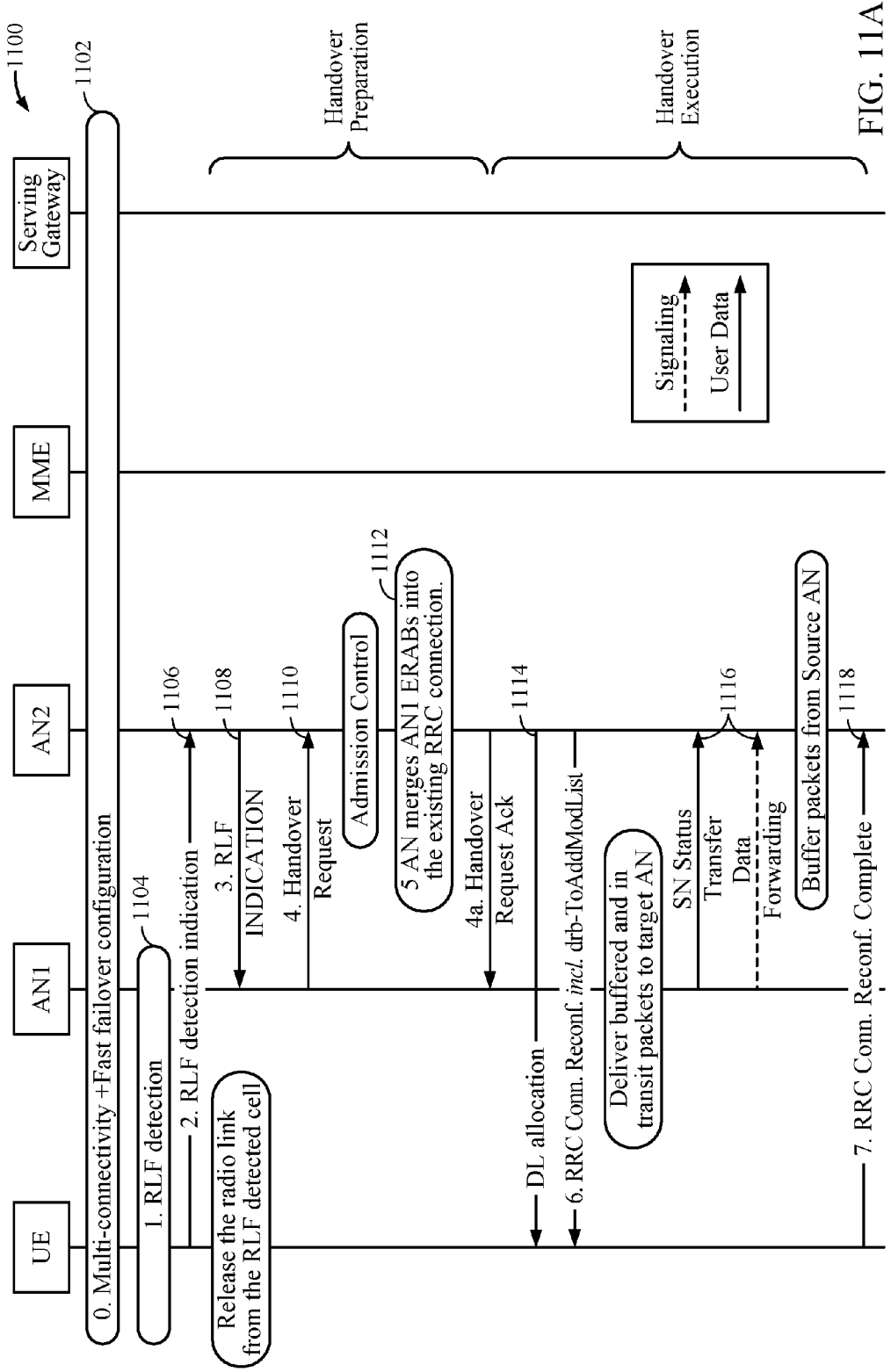
FIGS. 11A and 11B illustrate an example X2 based UE initiated fast failover call flow, in accordance with aspects of the present disclosure.
Figure 11B:
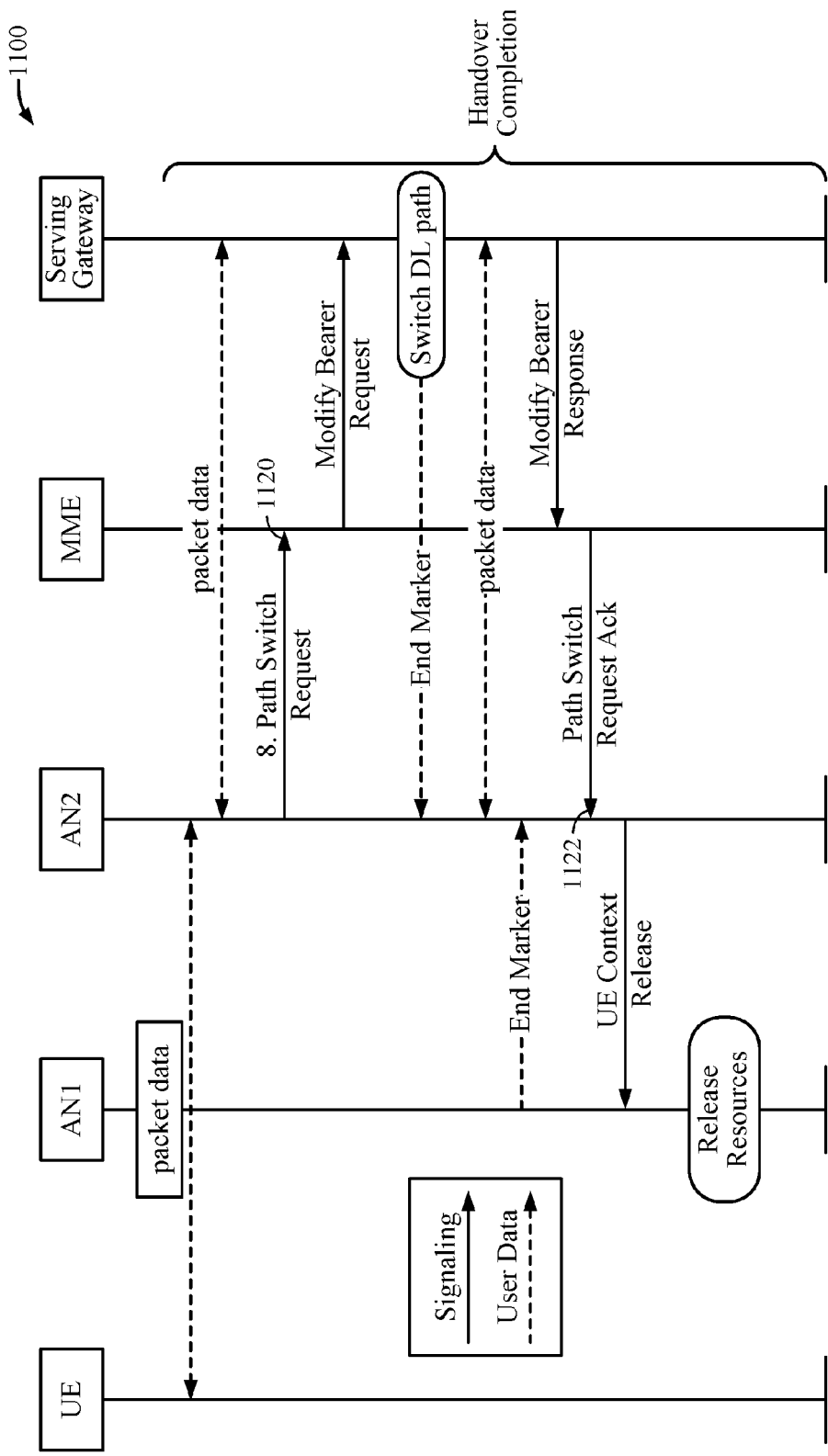

FIG. 11 illustrates an example X2 based UE initiated fast failover call flow 1100, in accordance with aspects of the present disclosure. At 1102, a UE may be configured for multi-connectivity including a fast failover configuration as described in conjunction with FIG. 10. At 1104, the UE may detect a RLF on a first RRC connection with a first AN AN1. At 1106, the UE declares the RLF detection via a second RRC connection to a second AN AN2. This may be performed, for example, by sending a new UL-DCCH message, such as RRCConnectionReestablishmentRequest. This message may also convey an identifier for the first AN AN1, such as a global AN-ID, enabling the second AN AN2 to determine which AN corresponds to the first AN AN1 so the second AN AN2 may fetch the UE context.

At 1108, the second AN AN2 may send a RLF indication, for example, a X2AP RLF INDICATION to the first AN AN1. The first AN AN1, upon receiving the RLF indication, responds to the second AN AN2 with a handover request at 1110 and performs handover preparations. At 1112, the second AN AN2 merges the first AN's AN1 E-RAB associated with the UE into existing RRC connections so the UE context is appropriately updated. At 1114, the second AN AN2 adds EPC bearers previously served by the first AN AN1 via, for example, RRC connection reestablishment procedures or RRC connection reconfiguration procedures. At 1116, the first AN AN1 transfers status and data information to the second AN AN2.

At 1118, the UE sends a complete message after completion of the reestablishment or reconfiguration procedure.

The second AN AN2, at 11120, send an S1AP path switch request to the MME. This path switch request may include all bearers, that is, the bearers previously established between the second AN AN2 and the UE, along with bearers transferred from the first AN AN1. The MME may then respond, at 1122, accepting the addition of the bearers transferred from the first AN AN1. The second AN AN2 may then send an indication to the first AN AN1 that the first AN AN1 may release the context and resources related to the UE.

Figure 12:
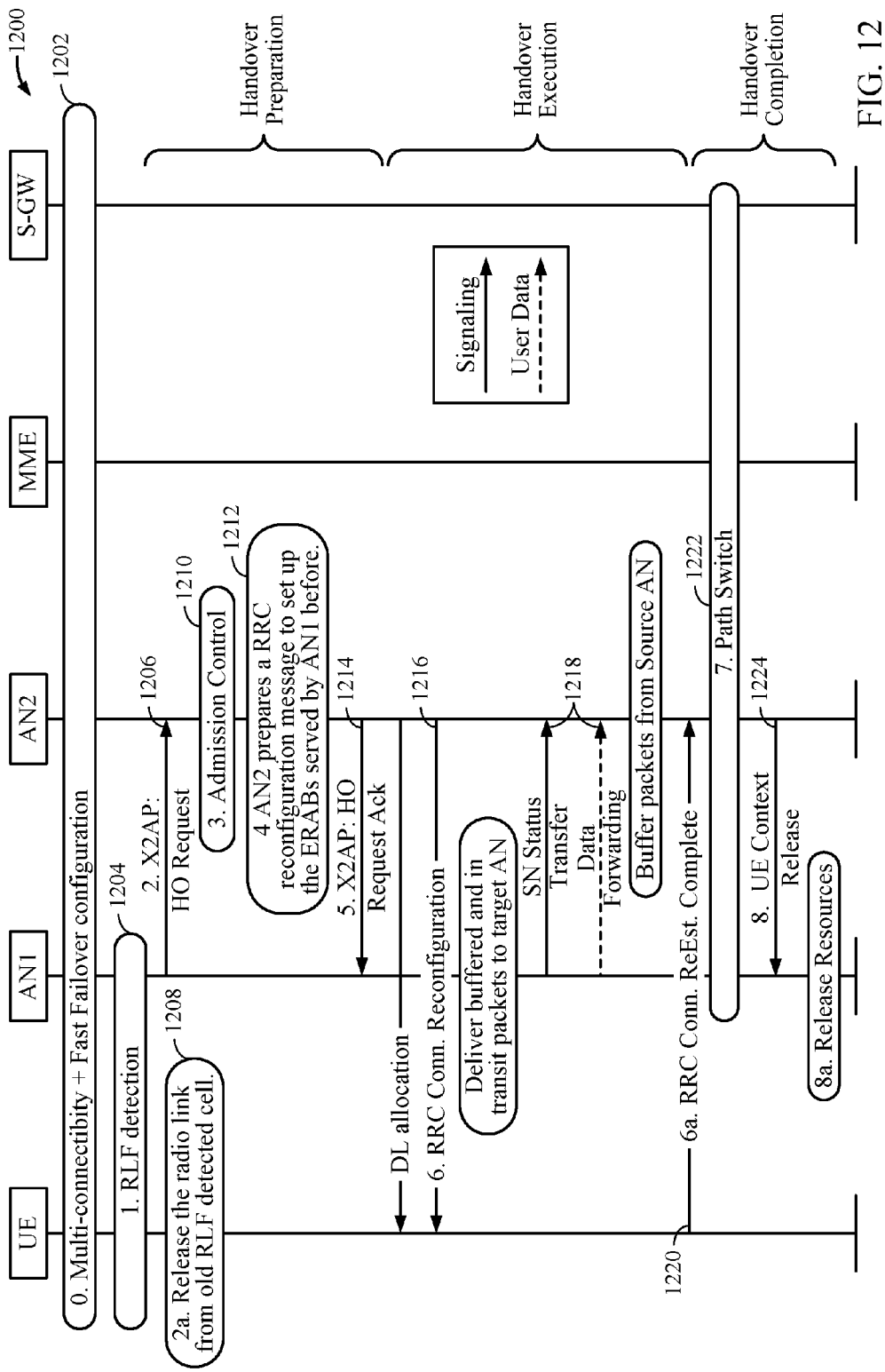
FIG. 12 illustrates an example X2 based network initiated fast failover call flow, in accordance with aspects of the present disclosure.

FIG. 12 illustrates an example X2 based network initiated fast failover call flow 1200, in accordance with aspects of the present disclosure. At 1202, a UE may be configured for multi-connectivity including a fast failover configuration as described in conjunction with FIG. 10. At 1204, a first AN AN1 may detect a RLF on a first RRC connection with the UE. At 1206, the first AN AN1 requests, to a second AN AN2, to handover the E-RABs associated with the UE and served by the first AN AN1. At 1208, the UE releases the radio connection from the first AN AN1. At 1210, the second AN AN2 verifies that the requested E-RABs can be established by the second AN AN2. If the second AN AN2 cannot verify that the requested E-RABs can be established, then the RRC connection reconfiguration 1216 procedure may not occur and the second AN AN2 would reject the reconfiguration request by sending a reject message or just discarding the X2AP HO request message and not send back any response message.

Figure 13A:
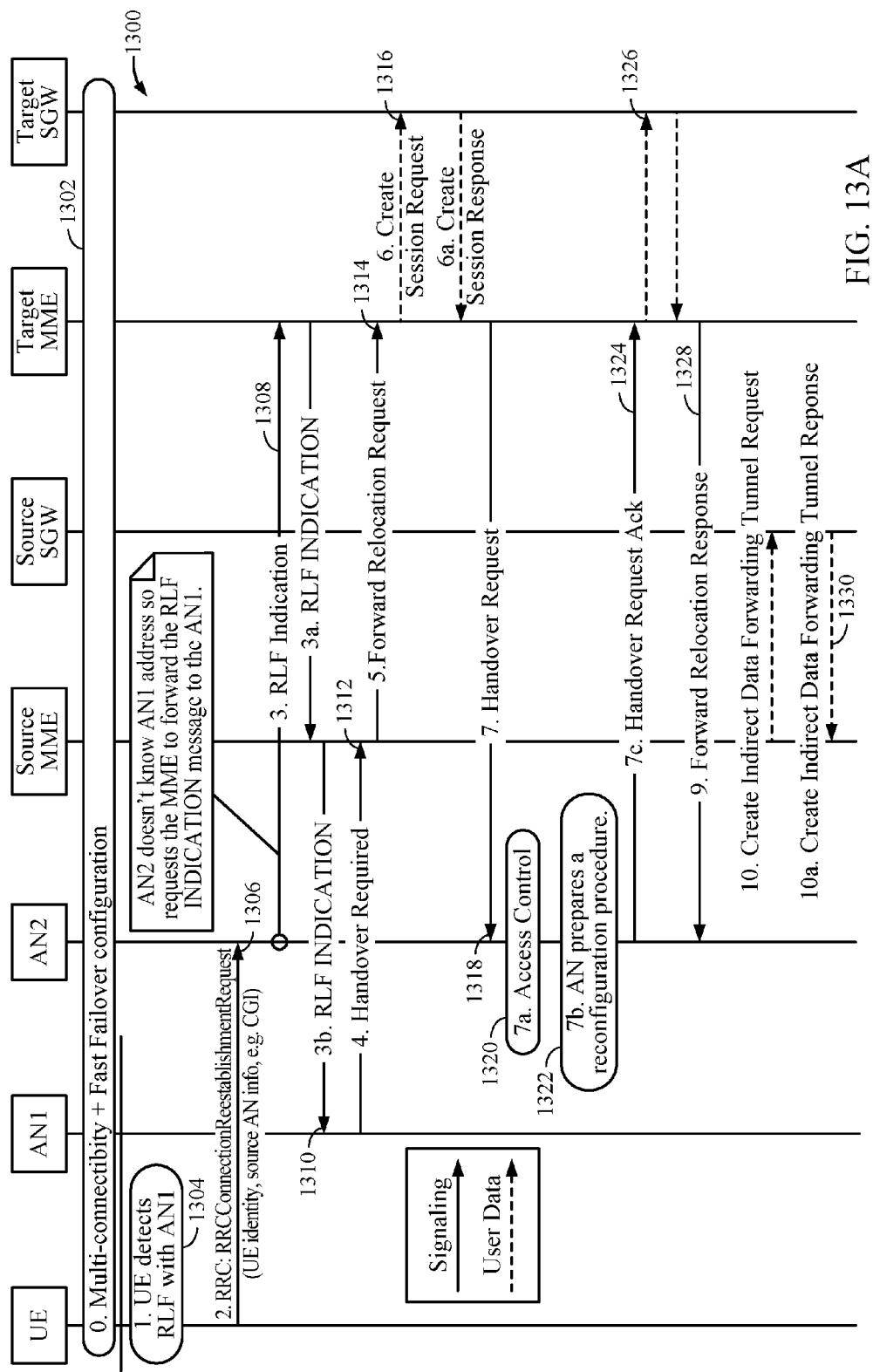
FIGS. 13A and 13B illustrate an example S1 based UE initiated fast failover call flow, in accordance with certain aspects of the present disclosure.
Figure 13B:
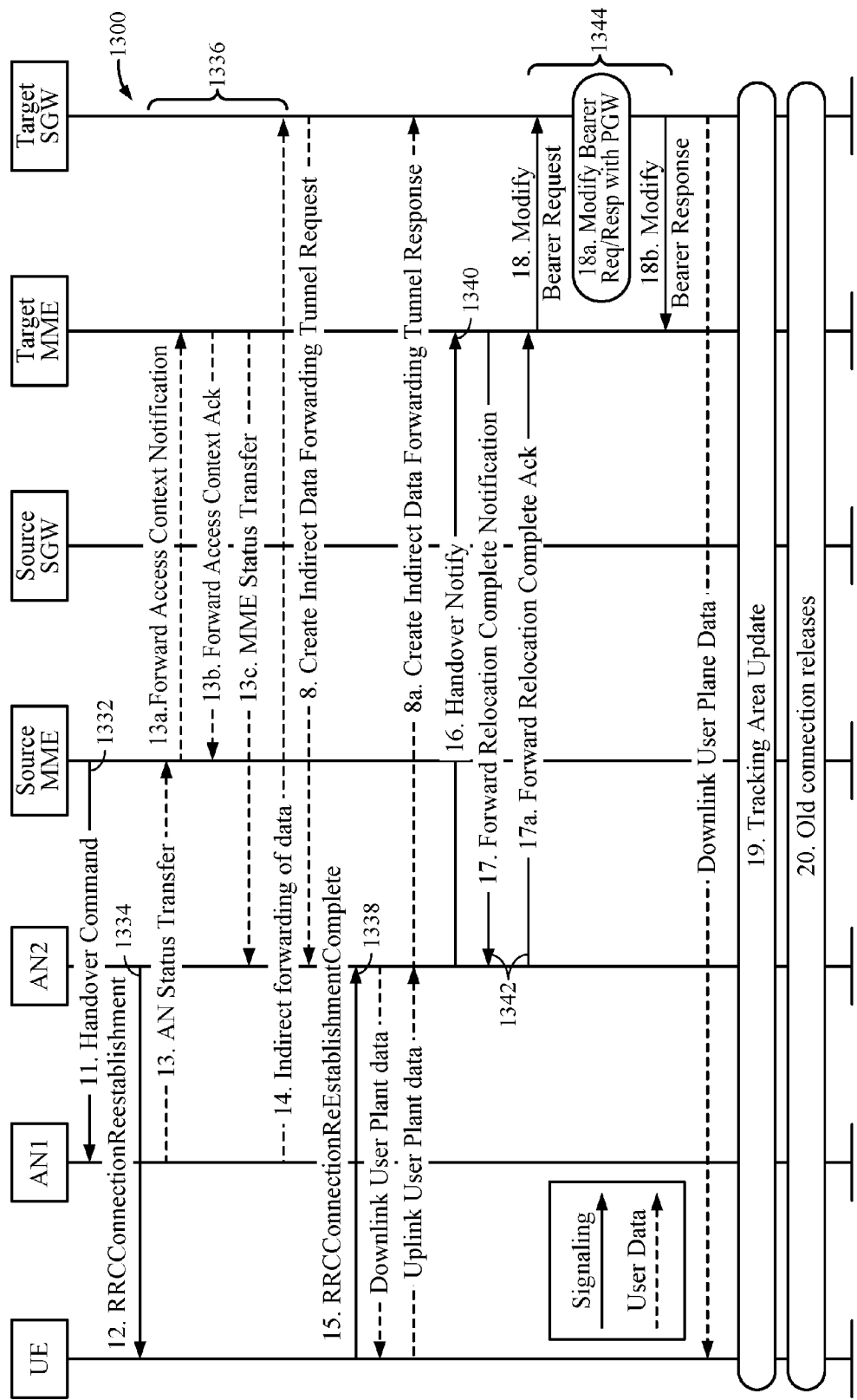

Otherwise, at 1212, the second AN AN2 prepares the RRC connection reconfiguration messages reestablishing the E-RABs served by the first AN AN1 with the second AN AN2. At 1214, the second AN AN2 acknowledges the handover request from the first AN AN1 via the X2 interface. This may be performed, for example, using a new X2AP HO Request message, or an existing Handover Request message. At 1216, the second AN AN2 may send a DL RRC message, such as RRC:RRCConnectionReconfiguration message to the UE. The first AN AN1, at 1218, transfers status and user data buffered in the first AN AN1 to the second AN AN2. The first AN AN1, at 1220, then receives an indication, such as a RRC connection reconfiguration complete message as an acknowledgment, from the UE upon successful competition of the RRC reconfiguration procedure. At 1222, the second AN AN2 performs path switching from the first AN AN1 to the second AN AN2. At 1224, the second AN AN2 may then send an indication to the first AN AN1 that the first AN AN1 may release the context and resources related to the UE.

Where more than one MME cloud is involved in multi-connectivity, fast failover requires use of an S1 based procedure. FIG. 13 illustrates an example S1 based UE initiated fast failover call flow 1300, in accordance with certain aspects of the present disclosure. At 1302, a UE may be configured for multi-connectivity including a fast failover configuration as described in conjunction with FIG. 10. At 1304, the UE may detect a RLF on a first RRC connection with the first AN AN1. At 1306, the UE declares the RLF detection via a second RRC connection to a second AN via an uplink message. The uplink message may be, for example, an RRCConnectionReEstablishmentRequest message, and the UE may use a dedicated resource in the second AN AN2 to transfer the RLF indication message (e.g., RRCConnectionReEstablishmentRequest). The second AN AN2 however, does not know how to contact the first AN AN1. At 1308, the second AN AN2 may attempt to determine how to contact the first AN AN1 by sending, for example, an S1 RLF indication message to the MME so that the MME can determine how to route the RLF Indication message to the first AN AN1. Each AN may be configured with, for example, a Cell Global ID (CGI)=PLMN ID+Cell-ID).

At 1310, the first AN AN1 receives the RLF indication message from the connected MME. The first AN AN1, upon receiving the RLF indication, responds to the second AN AN2 with a handover request at 1312 and performs handover preparations. At 1314, a source MME sends a Forward Relocation Request message to a target MME. At 1316, the target MME creates a new session at an S-GW connected to the second AN AN2. At 1318, the target MME requests the second AN AN2 to handover, for example, via a RRC connection re-establishment procedure, E-RABs associated with the UE and served by the first AN AN1. At 1320, the second AN AN2 checks if there are enough resources to serve the new E-RABs, which were served by the first AN AN1 previously. If the second AN AN2 does not have enough resources, then the RRC connection reconfiguration procedure may not occur and the second AN AN2 would reject the re-establishment request by sending a reject message, for example, a RRCConnectionReEstablishmentReject message or just discarding the RRC connection re-establishment request message and not send back any response message.

Otherwise, at 1322, the second AN AN2 prepares the RRC connection re-establishment procedure and sends an acknowledgment back to the target MME at 1324. At 1326, a target S-GW creates an indirect data forwarding tunnel for data forwarding during the RRC connection re-establishment procedure, and at 1328, the source MME receives the Forward Request Response. At 1330, a source S-GW creates an indirect data forwarding tunnel for data forwarding during the zone update procedure. At 1332, the source MME tells the first AN AN1 the indirect data forwarding tunnel information via, for example, a handover command message. At 1334, the second AN AN2 sends an RRC message, for example, a RRCConnectionReestablishment message, to the UE to re-establish the RRC connection as well as E-RABs, which were previously served by the first AN AN1.

The first AN AN1, at 1336, forwards status and user data buffered in the first AN AN1 to the second AN AN2 via the indirect data forwarding tunnel. At 1338, the UE sends back an RRC response message to the second AN AN2 upon completion of the RRC connection re-establishment procedure. At 1340, the second AN AN2 tells the target MME the completion of the relocation procedure. At 1342, the target MME notifies the source MME of the completion of the relocation procedure and the source MME acknowledges the reception of the notification. At 1344, the target MME requests the target S-GW to modify the bearers so that only the target S-GW serves the UE and the target S-GW sends a message modifying the bearers in response.

Figure 14A:
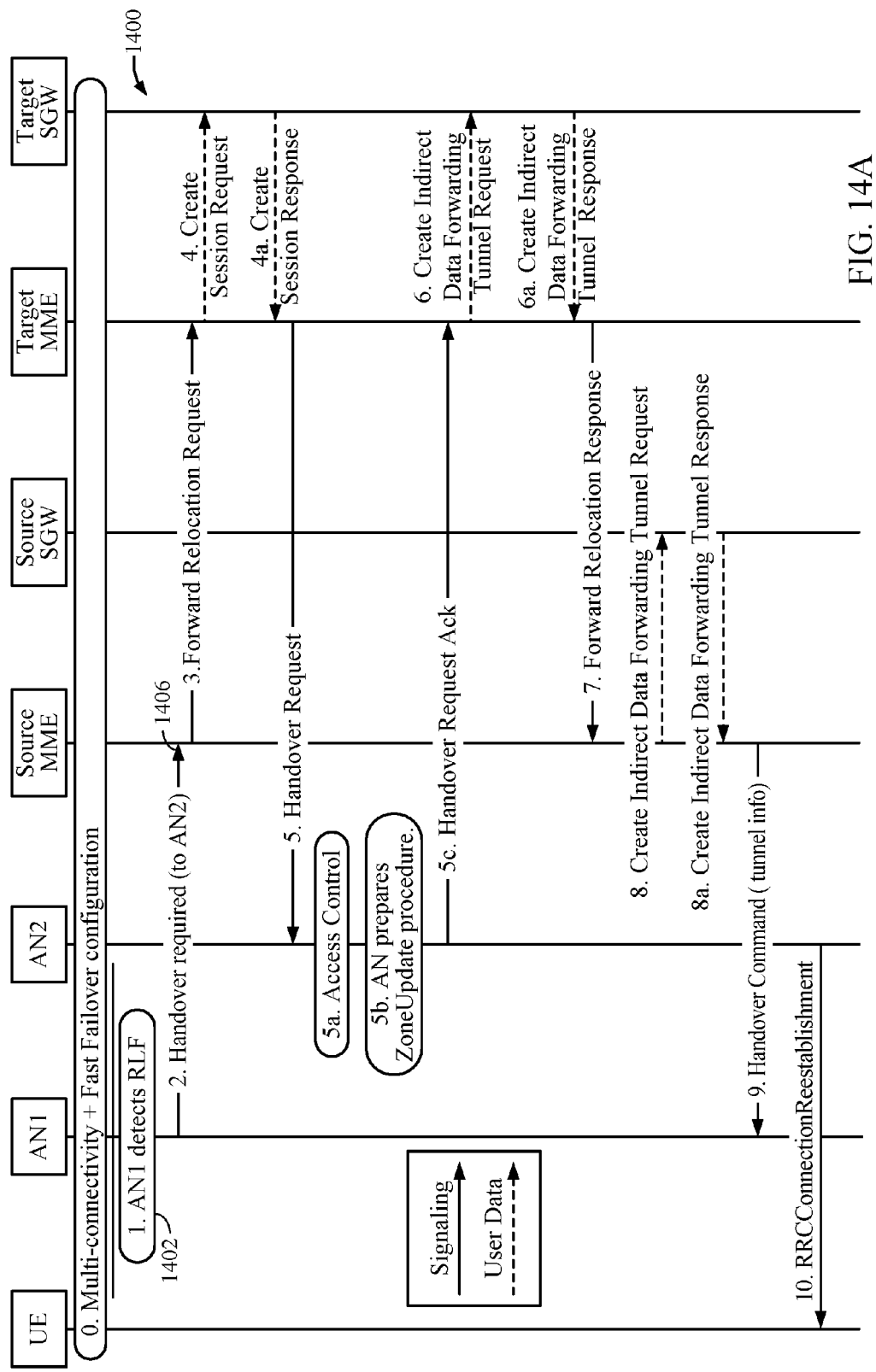
FIGS. 14A and 14B illustrate an example S1 based NW initiated fast failover call flow, in accordance with certain aspects of the present disclosure.
Figure 14B:
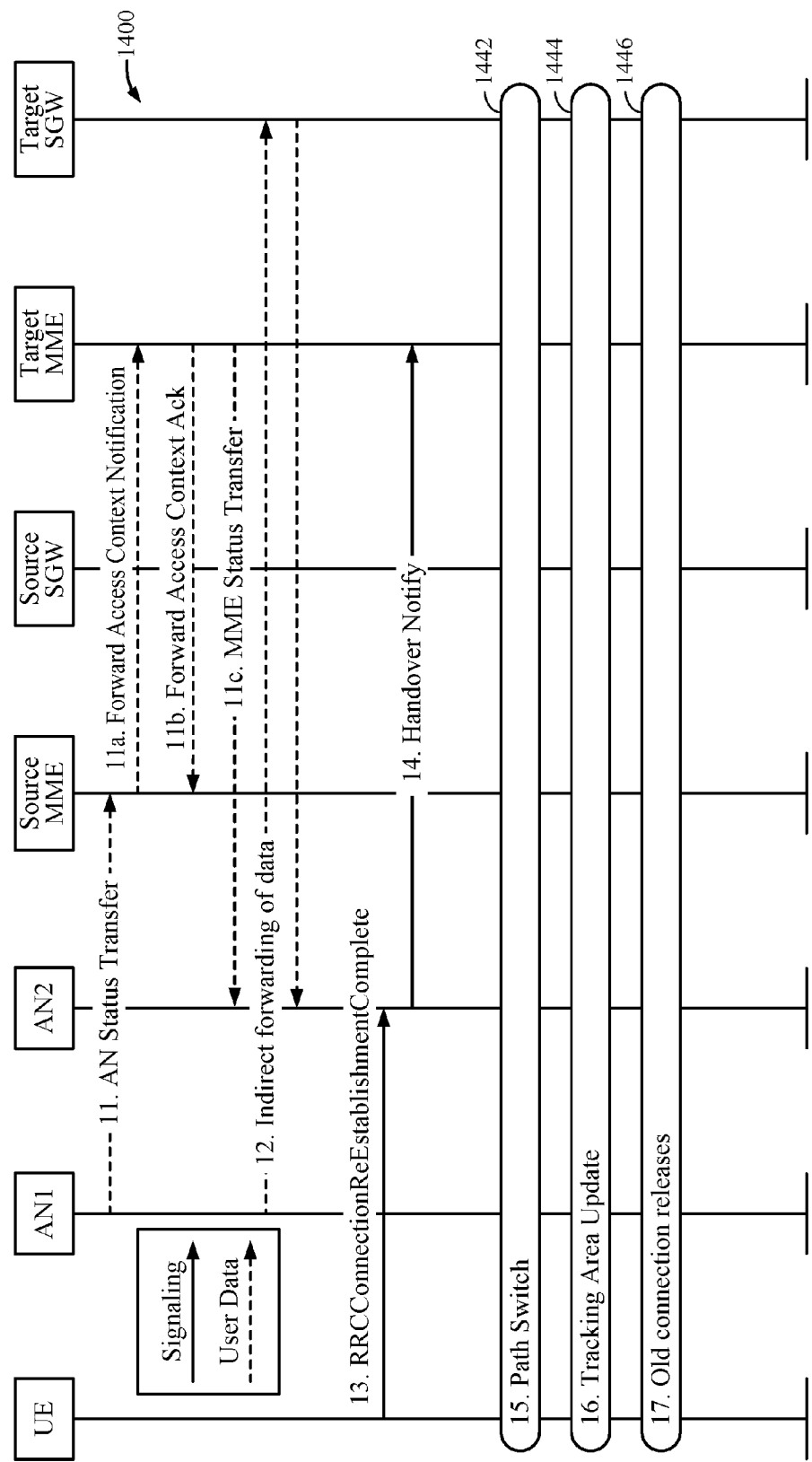

FIG. 14 illustrates an example S1 based NW initiated fast failover call flow 1400, in accordance with certain aspects of the present disclosure. In 1400, a UE may be configured for multi-connectivity as described with respects to 1302 and FIGS. 10 and 13. At 1404, a first AN AN1 may detect a RLF on a first RRC connection with the UE. At 1406, the first AN AN1 initiates a handover procedure through the S1 interface towards a second AN AN2. In certain aspects, the handover procedure through the S1 interface corresponds with the handover procedure discussed in conjunction with 1306-1340 of FIG. 13. At 1442, the ANs and the CN nodes perform the path switch from first AN AN1 to the second AN AN2 for the handed-over E-RABs. At 1444, the UE performs the tracking area update, and at 1446, the network releases the resources assigned for the UE at the first AN AN1.

Figure 15:
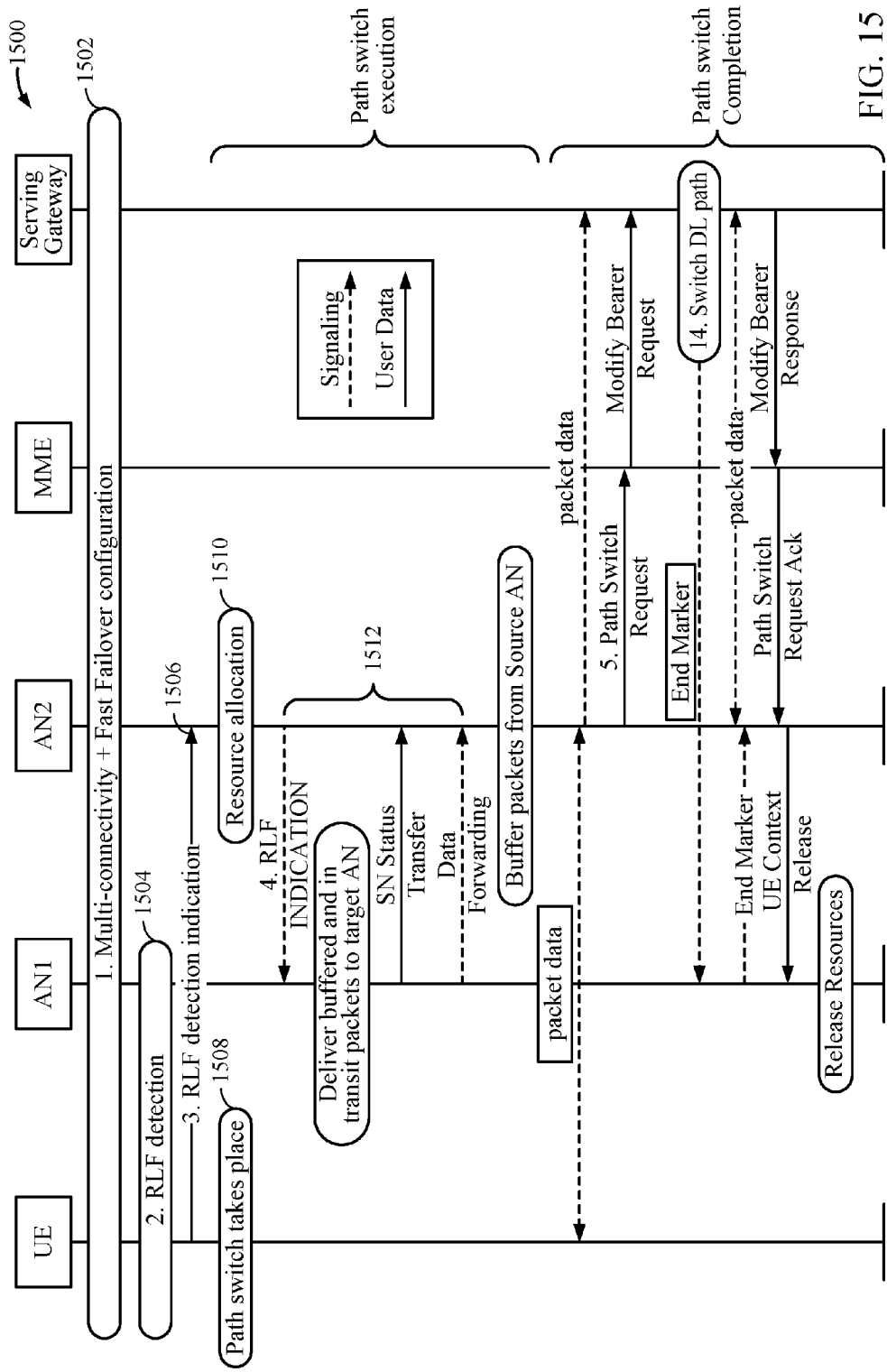
FIG. 15 illustrates an example autonomous path-switch fast failover call flow, in accordance with certain aspects of the present disclosure.

When the bearer is split, a UE, upon detection of RLF may be able to switch data paths immediately if the network preconfigures the bearer configuration for a second AN AN2. For example, the network may preconfigure a Logical Channel Group (LCG) so that UE can request UL resource for the bearer served by the second AN AN2 after RLF with a first AN AN1. FIG. 15 illustrates an example autonomous path-switch fast failover call flow 1500, in accordance with certain aspects of the present disclosure. At 1502, a UE may be configured for multi-connectivity including a fast failover configuration. As a part of the configuration, or during a reconfiguration, the network preconfigures some parameters, such as the LCG, for the path switch procedure. At 1504, the UE detects RLF with the first AN AN1. At 1506, UE declares the RLF detection via a second RRC connection to a second AN AN2. This may be performed by, for example, sending a new UL-DCCH message RRCConnectionReestablishmentRequest or PathSwitchRequest to the second AN AN2 from the first AN AN1, another AN, the UE, or via the network.

Figure 16A:
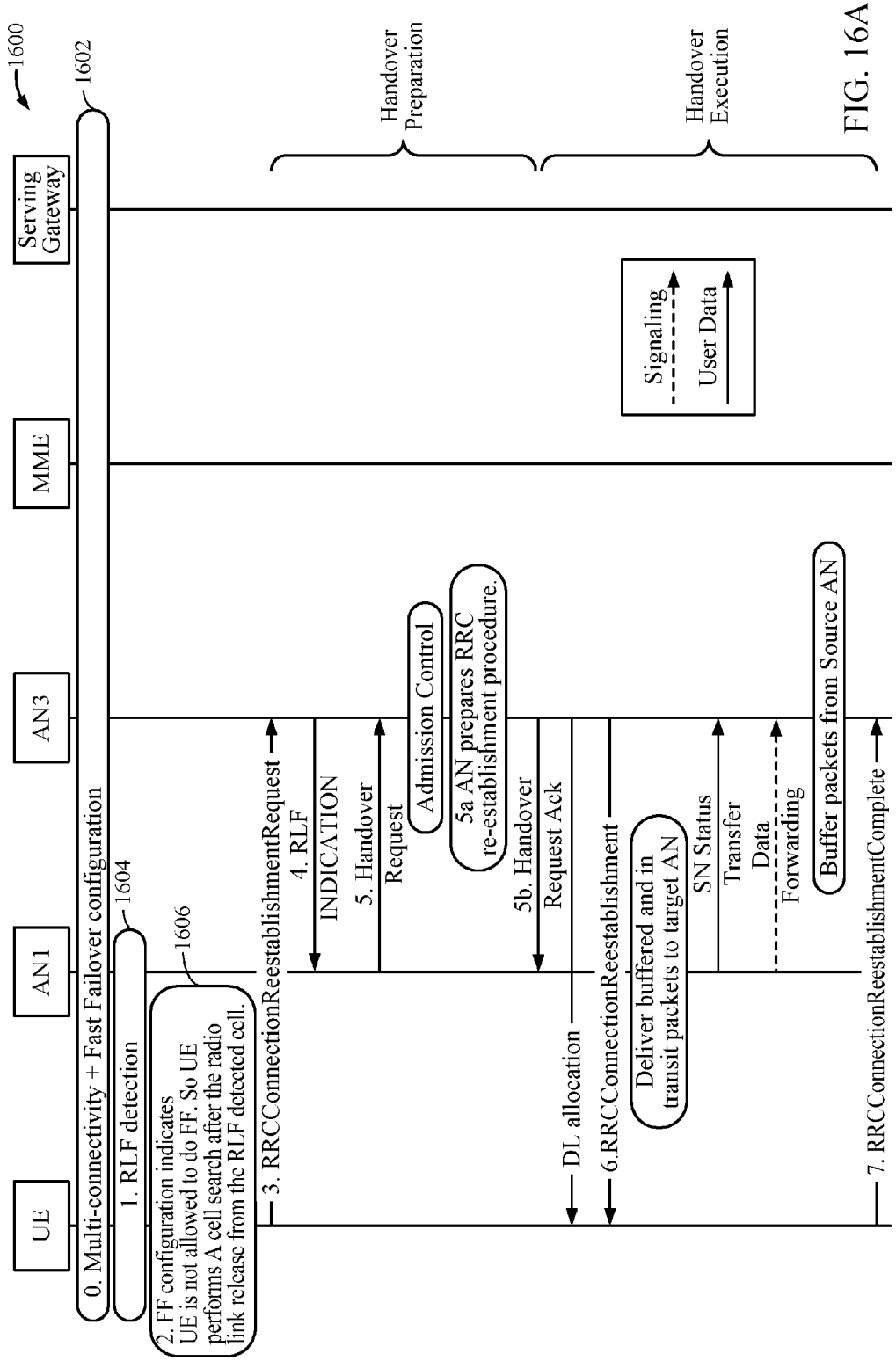
FIGS. 16A and 16B illustrate an example RRC connection reestablishment without fast failover call flow, in accordance with aspects of the present disclosure.
Figure 16B:
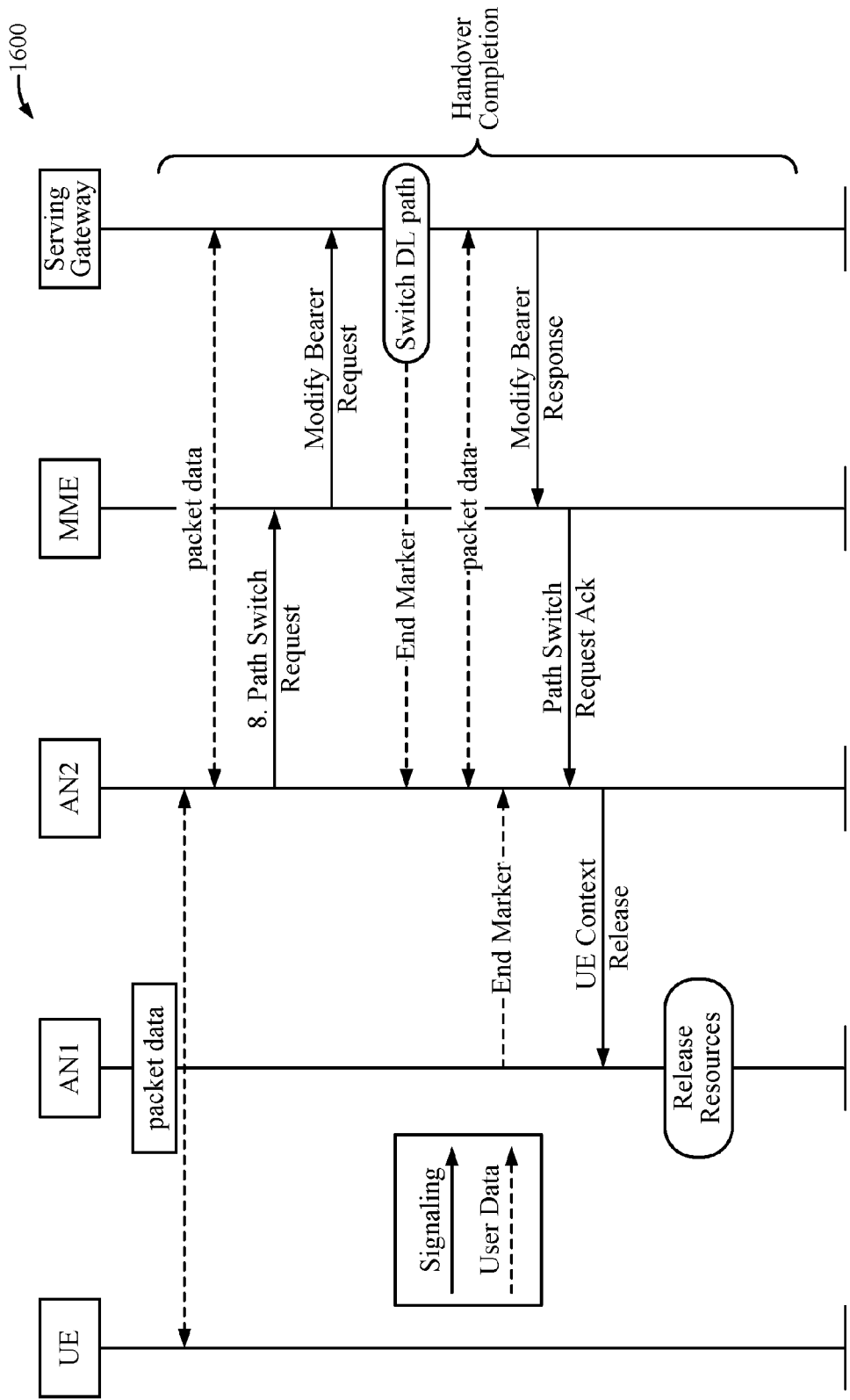

At 1508, the UE autonomously switches the data path from the first AN AN1 to the second AN AN2. At 1510, the second AN AN2 performs a path switch upon reception of the RLF detection indication and allocates resources for the bearers previously served by the first AN AN1. At 1512, the second AN AN2 may send an indication of RLF to the first AN AN1 and the first AN AN1 begins data forwarding to the second AN AN2. Alternatively, the first AN AN1 may also detect the RLF at 1504 and start data forwarding to the second AN AN2 after RLF detection. At 1514, the second AN AN2 requests that the MME switch the downlink GPRS tunnel towards the new tunnel endpoint at the second AN AN2. This request includes all bearers associated with the UE (i.e. the existing bearers and the bearers transferred from the first AN AN1) and informs the MME that the UE has performed a failover to the second AN AN2.

Where fast failover is not available, the UE may perform an RRC connection reestablishment without fast failover. FIG. 16 illustrates an example RRC connection reestablishment without fast failover call flow 1600, in accordance with aspects of the present disclosure. At 1602, a UE may be configured for multi-connectivity including a fast failover configuration. The fast failover configuration indicates to the UE not to perform a fast failover procedure for either any AN, or for particular ANs/cells, services, or flows. The configuration may include RRC connection re-establishment destination information related to supported frequency band or RAT information.

At 1604, the UE detects a RLF on a first RRC connection with a first AN AN1. At 1606, the UE may perform a cell search on supported frequency bands, or the frequency bands or RAT indicated in the fast failover configuration. If an appropriate cell is found, the UE then attempts to camp on the cell. If the UE successfully camps on a second AN AN2, the UE may declare the RLF with the first AN AN1 to the second AN AN2, in a manner corresponding to 1106 and FIG. 11. The second AN AN2 may then perform an X2 or context fetch based RRC connection reestablishment as described in conjunction with 1108-1122 of FIG. 11.

Figure 17A:
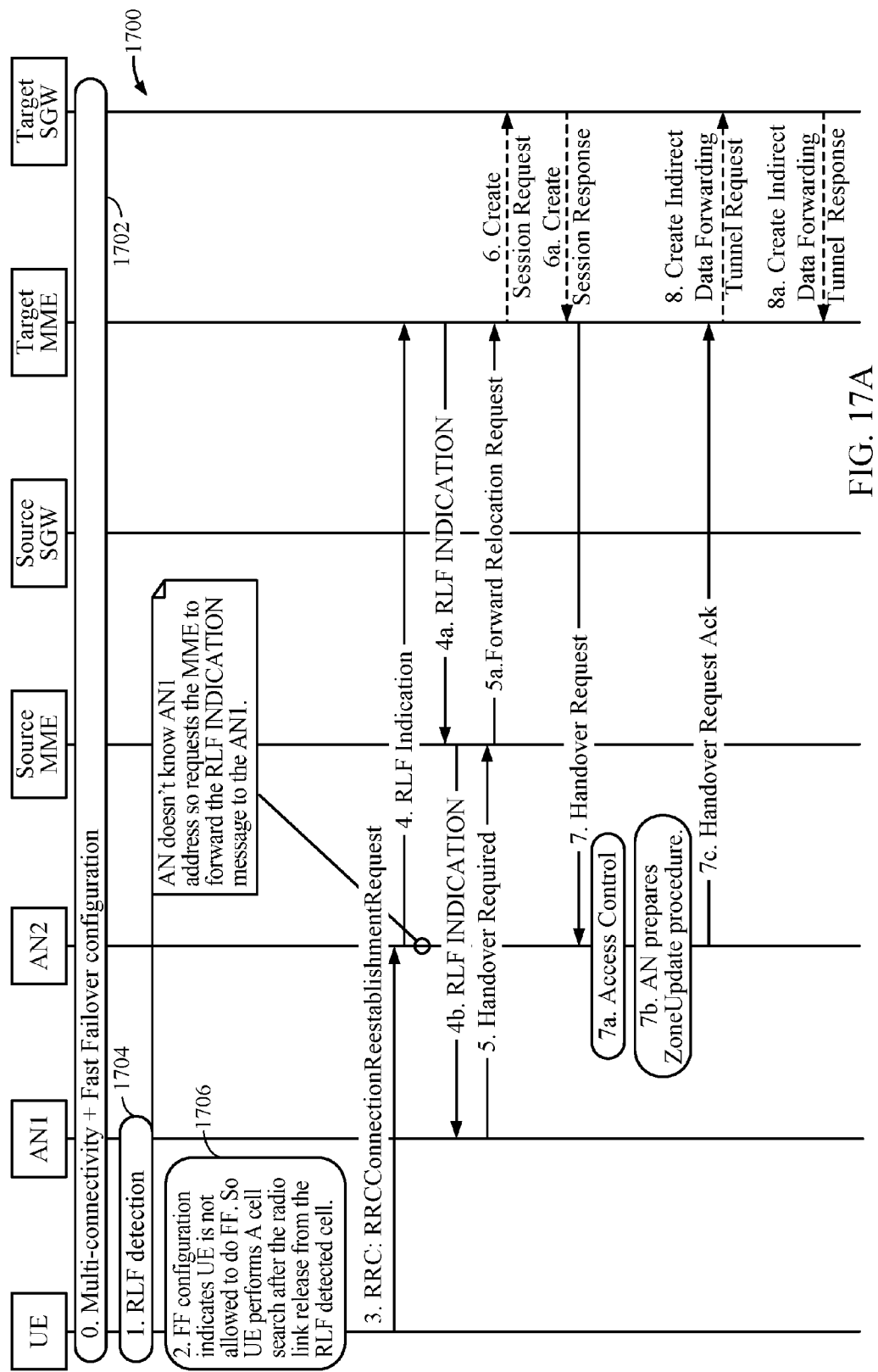
FIGS. 17A and 17B illustrate an example S1-based context fetch RRC connection re-establishment call flow 1700, in accordance with aspects of the present disclosure.
Figure 17B:
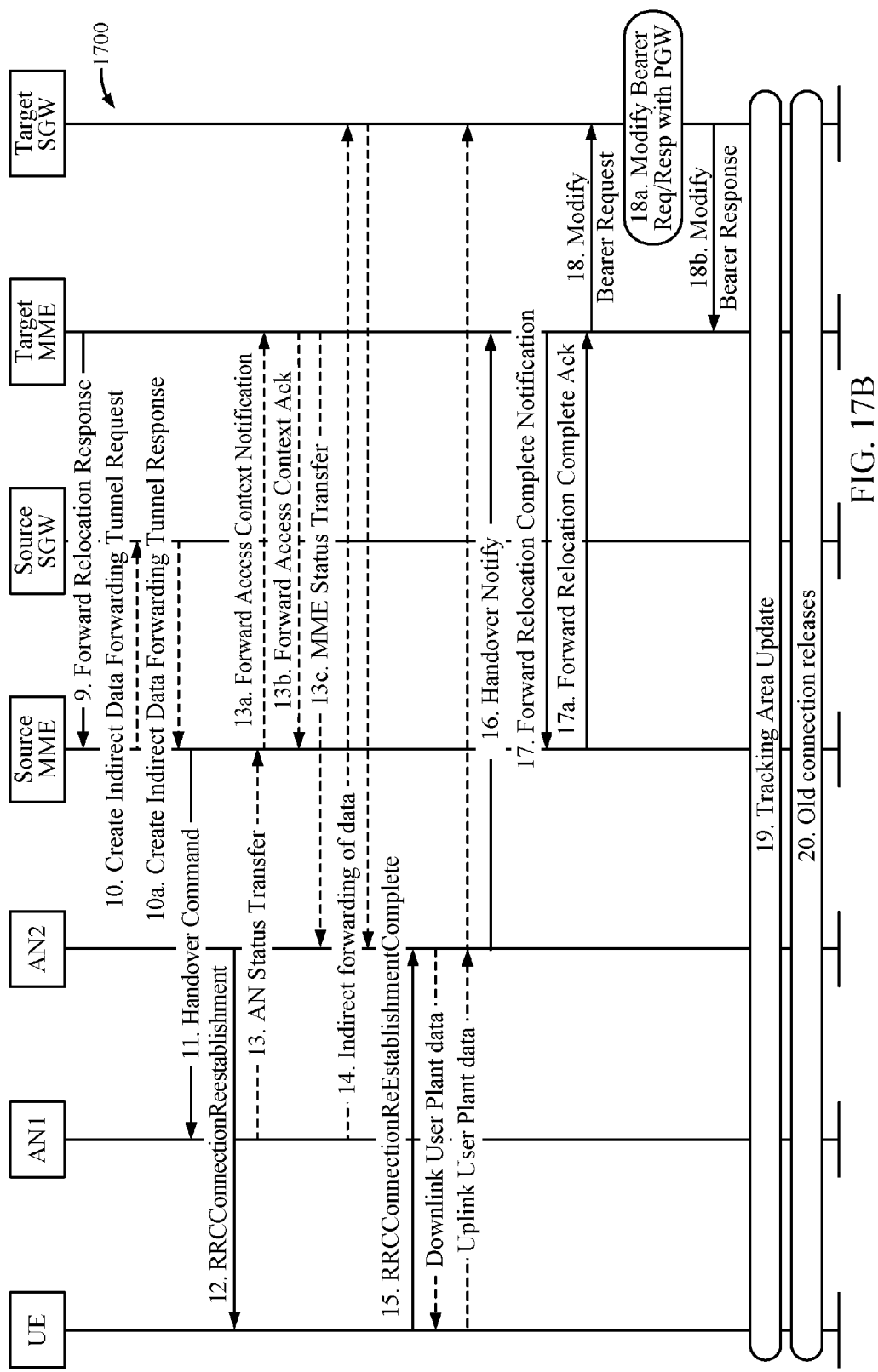

FIG. 17 illustrates an example S1-based context fetch RRC connection re-establishment call flow 1700, in accordance with aspects of the present disclosure. At 1702, a UE may be configured for multi-connectivity including a fast failover configuration. The fast failover configuration indicates to the UE not to perform a fast failover procedure for either any AN, or for particular ANs/cells, services, or flows. The configuration may include information related to supported frequency band or RAT information.

At 1704, the UE detects a RLF and performs a cell search, as described in conjunction with 1604-1606 of FIG. 16. If an appropriate cell is found, the UE then attempts to camp on the cell. If the UE successfully camps on a second AN AN2, the UE may declare the RLF with the first AN AN1 to the second AN AN2. This may be performed, for example, by sending an RRC message, such as RRCConnectionReestablishmentRequest including the UE identity. The RRC message may also include the source AN identity. The second AN AN2 however, does not know how to contact the first AN AN1 and performs a S based context fetch procedure as described in conjunction with 1308-1344 of FIG. 13.

Figure 18:
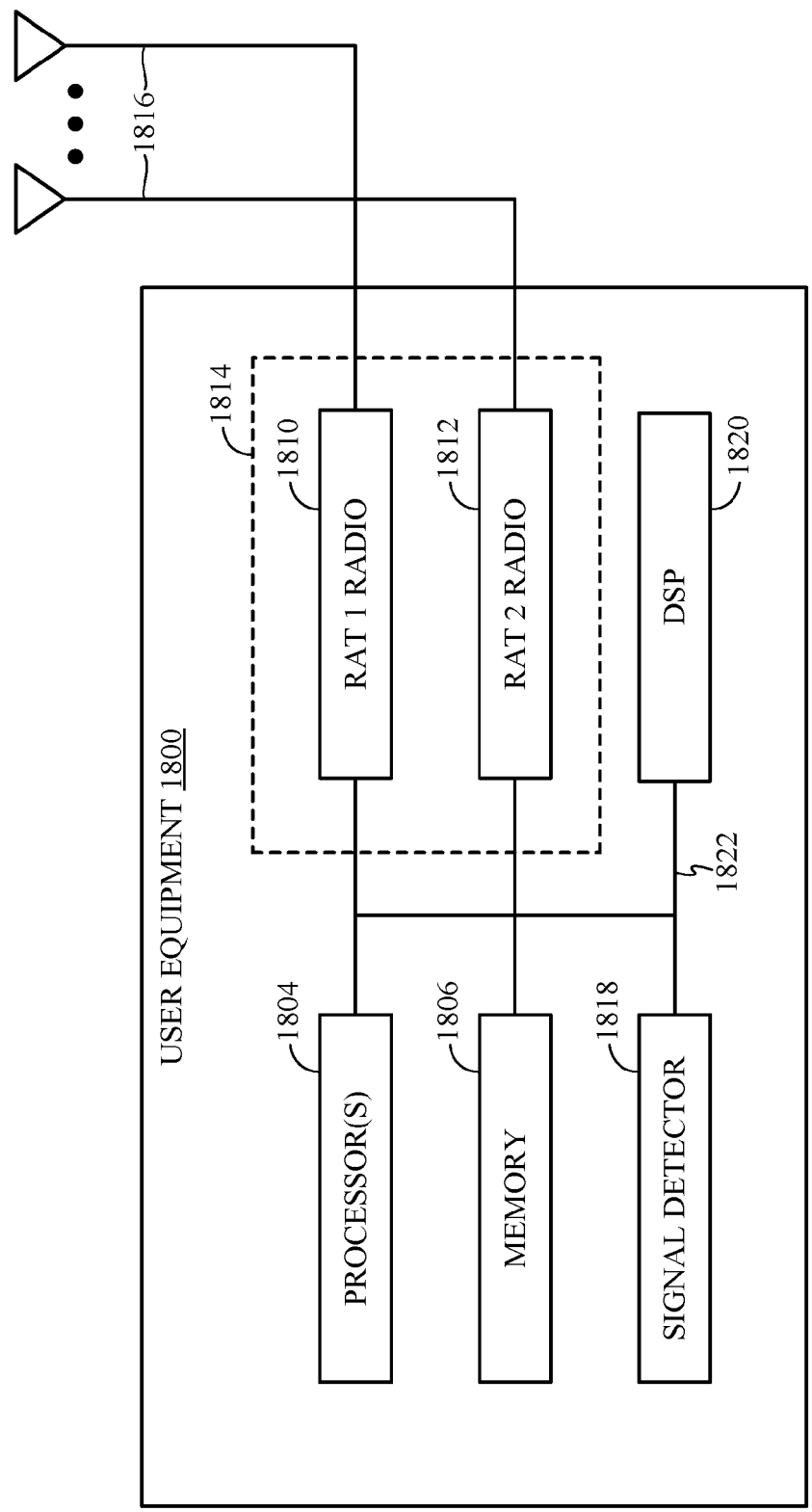
FIG. 18 illustrates a block diagram of an example user equipment, in accordance with aspects of the present disclosure.

FIG. 18 illustrates various components that may be utilized in a MC enabled wireless device 1800 capable of operating in accordance with aspects provided herein. The wireless device 1800 may, for example, be one implementation of UE 110 shown in FIG. 1.

The wireless device 1800 may include one or more processors 1804 which control operation of the wireless device 1800. The processors 1804 may also be referred to as central processing units (CPUs). The processors 1804 may perform, or direct the UE in managing fast failover, as described with reference to FIGS. 10-17. Memory 1806, which may include both read-only memory (ROM) and random access memory (RAM), provides instructions and data to the processors 1804. A portion of the memory 1806 may also include non-volatile random access memory (NVRAM). The processors 1804 typically perform logical and arithmetic operations based on program instructions stored within the memory 1806. The instructions in the memory 1806 may be executable to implement the methods described herein.

The wireless device 1800 may also include radios 1810 and 1812 to communicate via multiple RATs for MC. Each radio may, for example, include a transmitter and receiver, and any other "RF chain" components to allow transmission and reception of data between the wireless device 1800 and different RATs. While two radios are shown for two RATs, as an example only, more than two radios may be included (e.g., to support more than two RATs). Each radio may communicate via a single or a plurality of antennas 1816.

The wireless device 1800 may also include a signal detector 1818 that may be used in an effort to detect and quantify the level of signals received by the transceiver 1814. The signal detector 1818 may detect such signals as total energy, energy per subcarrier per symbol, power spectral density and other signals. The wireless device 1800 may also include a digital signal processor (DSP) 1820 for use in processing signals.

Figure 19:
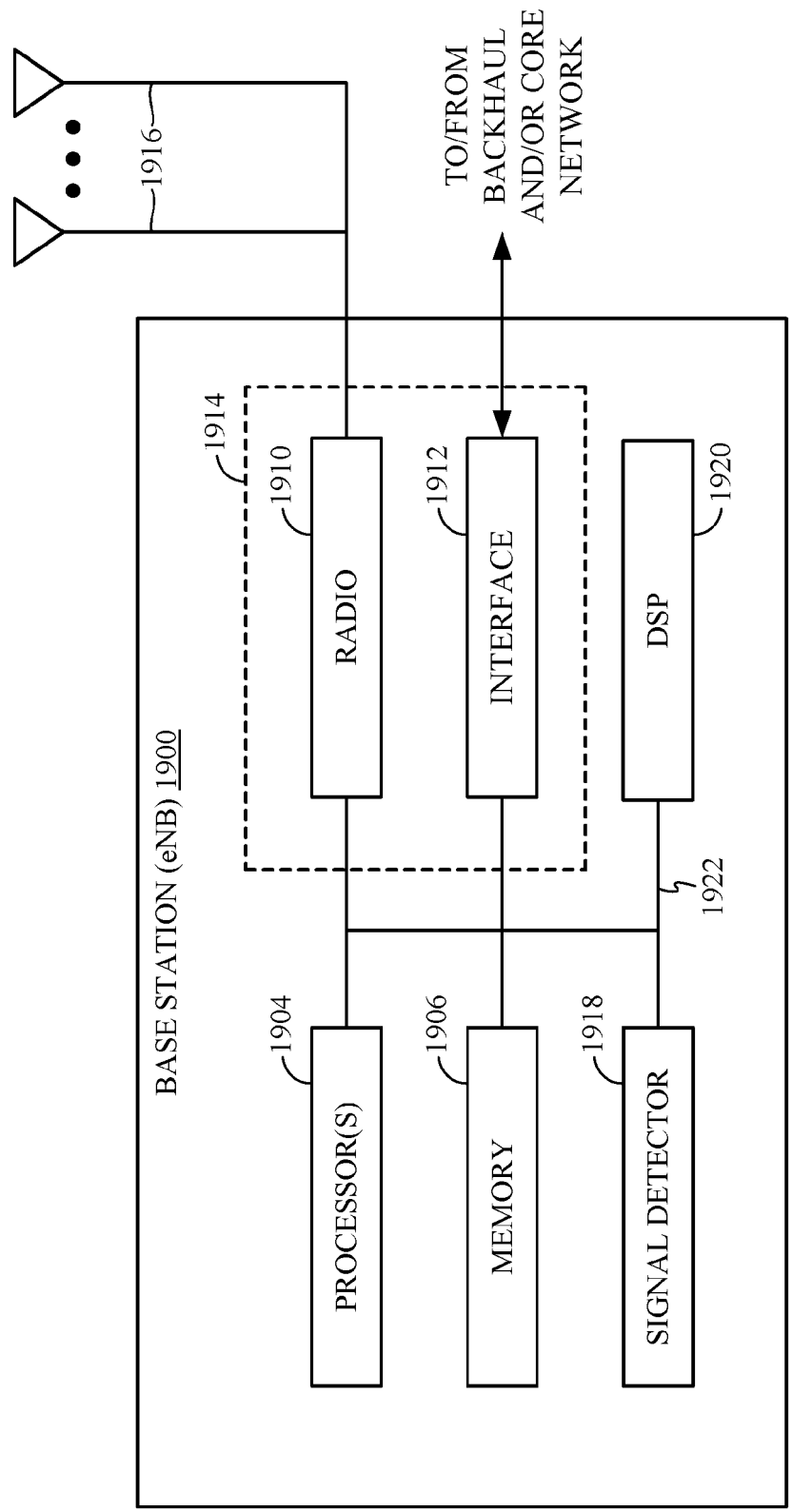
FIG. 19 illustrates a block diagram of an example base station, in accordance with aspects of the present disclosure.

FIG. 19 illustrates various components that may be utilized in a base station 1900 capable of participating in communication with a MC enabled wireless device. The base station 1900 may, for example, be one implementation of PRC 120 or SRC 130 shown in FIG. 1.

The base station 1900 may include one or more processors 1904 which control operation of the base station 1900. The processors 1904 may also be referred to as central processing units (CPUs). The processors 1904 may manage data or perform fast failover, as described with reference to FIGS. 10-17. Memory 1906, which may include both read-only memory (ROM) and random access memory (RAM), provides instructions and data to the processors 1904. A portion of the memory 1906 may also include non-volatile random access memory (NVRAM). The processors 1904 typically perform logical and arithmetic operations based on program instructions stored within the memory 1906. The instructions in the memory 1906 may be executable to implement the methods described herein.

The base station 1900 may also include one or more radios 1910, for example to communicate with a UE via one or more RATs. Each radio may, for example, include a transmitter and receiver, and any other "RF chain" components to allow transmission and reception of data between the base station 1900 and different UEs. Each radio may communicate via a single or a plurality of antennas 1916. The base station 1900 may also include an interface 1912 for communicating with other base stations (e.g., via an X2 backhaul connection) or a core network (e.g., via an S1 connection).

The base station 1900 may also include a signal detector 1918 that may be used in an effort to detect and quantify the level of signals received by the transceiver 1914. The signal detector 1918 may detect such signals as total energy, energy per subcarrier per symbol, power spectral density and other signals. The base station 1900 may also include a digital signal processor (DSP) 1920 for use in processing signals.

It is understood that the specific order or hierarchy of steps in the processes disclosed above is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a mobile device, comprising:
   establishing one or more first data flows with a first network entity utilizing a first Radio Resource Control (RRC) connection with the first network entity;
   determining a link recovery configuration, the link recovery configuration having information related to establishing a second data flow using a second RRC connection between the mobile device and another network entity from a list of network entities in the event of a link failure at the first network entity, wherein the link recovery configuration comprises the list of network entities;
   detecting a link failure at the first network entity affecting a service associated with the first data flows; and
   recovering the service associated with the first data flows from the link failure by selecting a second network entity from the list of network entities and establishing the second data flow associated with the service, using the second RRC connection between the mobile device and the selected second network entity, based on the link recovery configuration.

2. The method of claim 1, wherein the establishing the second data flow comprises utilizing one or more preexisting radio connections.

3. The method of claim 2, further comprising sending an indication of the link failure to the second network entity.

4. The method of claim 2, wherein:
   information related to establishing the second data flow comprises an indication of which network entity, of the list of network entities, to select; and
   selecting the second network entity is based on the indication.

5. The method of claim 2, wherein:
   the information related to establishing the second data flow comprises configuration information for the network entities in the list of network entities; and
   the second data flow is established with the second network entity using the configuration information.

6. The method of claim 2, further comprising:
   receiving, from a second network entity, a connection reestablishment request; and
   establishing the second data flow with the second network entity in response to the connection reestablishment request.

7. The method of claim 6, wherein the link recovery configuration comprises an indication the mobile device is to wait for the connection reestablishment request before establishing the second data flow with the second wireless node.

8. The method of claim 1, wherein the link recovery configuration is based on a predetermined policy.

9. The method of claim 1, wherein the link recovery configuration is received from a network entity.

10. The method of claim 1, further comprising providing, to a network entity, the link recovery configuration.

11. The method of claim 1, wherein the information related to establishing the second data flow is based on a core network configuration.

12. The method of claim 1, wherein the information related to establishing the second data flow is based on a service type associated with the first data flow.

13. The method of claim 1, wherein the link recovery configuration comprises an indication for the mobile device to perform a cell search for link recovery in response to detecting the link failure.

14. The method of claim 13, wherein:
the information related to establishing a second data flow comprises frequency carrier information; and
establishing the second data flow comprises searching for a second network entity based on the frequency carrier information to establish the second data flow.

15. The method of claim 13, wherein:
the information related to establishing a second data flow comprises radio access technology (RAT) information indicating one or more RATs for establishing the second data flow; and
establishing the second data flow comprises searching for a second network entity based on the RAT information to establish the second data flow.

16. The method of claim 13, wherein the link recovery configuration comprises an indication the mobile device is to perform a legacy radio resource control (RRC) connection reestablishment upon detecting the link failure at the first network entity and performing a legacy RRC connection reestablishment based on the indication.

17. A method for wireless communications by a network entity, comprising:
establishing a first data flow with a mobile device utilizing a first Radio Resource Control (RRC) connection with the mobile device;
determining a link recovery configuration, the link recovery configuration having information related to establishing a second data flow using a second RRC connection between the mobile device and another network entity from a list of network entities in the event of a link failure affecting a service associated with the first data flow, and wherein the link recovery configuration comprises the list of network entities;
detecting a link failure affecting the first data flow; and
taking action to initiate recovery from the link failure based on the link recovery configuration.

18. The method of claim 17, further comprising sending an indication of the link recovery configuration to the mobile device.

19. The method of claim 17, further comprising sending an indication of the link recovery configuration to another network entity.

20. The method of claim 17, wherein detecting the link failure comprises at least one of:
receiving an indication of the link failure from the mobile device; or
receiving an indication of the link failure from another network entity.

21. A method for wireless communications by a network entity, comprising:
determining a link recovery configuration, the link recovery configuration having information related to recovery, by a mobile device, from a link failure affecting a service associated with a first data flow established with the mobile device utilizing a first Radio Resource Control (RRC) connection with the mobile device, wherein the link recovery configuration comprises a list of network entities, wherein the information related to the recovery includes information related to establishing a second data flow utilizing a second RRC connection between the mobile device and another network entity from the list of network entities; and
taking action to configure the mobile device according to the link recovery configuration.

22. The method of claim 21, wherein the information comprises information related to establishing a second data flow utilizing one or more preexisting radio connections.

23. The method of claim 22, wherein:
the information related to establishing the second data flow further comprises configuration information for the network entities in the list of network entities.

24. The method of claim 21, wherein the information comprises an indication the mobile device is to wait for a connection reestablishment request before establishing the second data flow.

25. The method of claim 21, wherein the link recovery configuration is based on a predetermined policy.

26. The method of claim 21, further comprising receiving the link recovery configuration from another network entity.

27. The method of claim 21, wherein the information related to recovery is based on a core network configuration.

28. The method of claim 21, wherein the information related to recovery is based on a service type associated with the first data flow.

29. The method of claim 21, wherein the link recovery configuration comprises an indication for the mobile device to perform a cell search for link recovery in response to detecting the link failure.

30. The method of claim 29, wherein the information comprises frequency carrier information.

31. The method of claim 21, wherein:
the information comprises radio access technology (RAT) information indicating one or more RATs for establishing the second data flow.

32. The method of claim 21, wherein the information comprises an indication the mobile device is to perform a legacy radio resource control (RRC) connection reestablishment upon detecting the link failure.

33. The method of claim 21, further comprising:
receiving an indication of a link failure from the mobile device; and
performing a handoff procedure with the mobile device in response to receiving the indication.

34. The method of claim 33, wherein the indication of the link failure is received via an interface from another network entity.

35. The method of claim 33 further comprising:
receiving an identifier for another network entity experiencing a link failure with the mobile device; and
performing the handover procedure to handover the mobile device from the other network entity.

36. An apparatus for wireless communications by a mobile device, comprising:
means for establishing one or more first data flows with a first network entity utilizing a first Radio Resource Control (RRC) connection with the first network entity;
means for determining a link recovery configuration, the link recovery configuration having information related to establishing a second data flow using a second RRC connection between the mobile device and another network entity from a list of network entities in the event of a link failure at the first network entity, wherein the link recovery configuration comprises the list of network entities;
means for detecting a link failure at the first network entity affecting a service associated with the first data flows; and
means for recovering the service associated with the first data flows from the link failure by selecting a second network entity from the list of network entities and establishing the second data flow associated with the service, using the second RRC connection between the mobile device and the selected second network entity, based on the link recovery configuration.

37. An apparatus for wireless communications by a network entity, comprising:
    means for establishing a first data flow with a mobile device utilizing a first Radio Resource Control (RRC) connection with the mobile device;
    means for determining a link recovery configuration, the link recovery configuration having information related to establishing a second data flow using a second RRC connection between the mobile device and another network entity from a list of network entities in the event of a link failure affecting a service associated with the first data flow, and wherein the link recovery configuration comprises the list of network entities;
    means for detecting a link failure affecting the first data flow; and
    means for taking action to initiate recovery from the link failure based on the link recovery configuration.

38. An apparatus for wireless communications by a network entity, comprising:
    means for determining a link recovery configuration, the link recovery configuration having information related to recovery, by a mobile device, from a link failure affecting a service associated with a first data flow established with the mobile device utilizing a first Radio Resource Control (RRC) connection with the mobile device, wherein the link recovery configuration comprises a list of network entities, wherein the information related to the recovery includes information related to establishing a second data flow utilizing a second RRC connection between the mobile device and another network entity from the list of network entities; and
    means for taking action to configure the mobile device according to the link recovery configuration.

39. An apparatus for wireless communications by a mobile device, comprising:
    an interface configured to establish one or more first data flows with a first network entity utilizing a first Radio Resource Control (RRC) connection with the first network entity; and
    a processing system configured to:
        determine a link recovery configuration, the link recovery configuration having information related to establishing a second data flow using a second RRC connection between the mobile device and another network entity from a list of network entities in the event of a link failure at the first network entity, wherein the link recovery configuration comprises the list of network entities;
        detect a link failure at the first network entity affecting a service associated with the first data flows; and
        recover the service associated with the first data flows from the link failure by selecting a second network entity from the list of network entities and establishing the second data flow associated with the service, using the second RRC connection between the mobile device and the selected second network entity, based on the link recovery configuration.

40. An apparatus for wireless communications by a network entity, comprising:
    an interface configured to establish a first data flow with a mobile device utilizing a first Radio Resource Control (RRC) connection with the mobile device; and
    a processor configured to:
        determine a link recovery configuration, the link recovery configuration having information related to establishing a second data flow using a second RRC connection between the mobile device and another network entity from a list of network entities in the event of a link failure affecting a service associated with the first data flow, and wherein the link recovery configuration comprises the list of network entities;
        detect a link failure affecting the first data flow; and
        take action to initiate recovery from the link failure based on the link recovery configuration.

41. An apparatus for wireless communications by a network entity, comprising:
    an processor configured to:
        determine a link recovery configuration, the link recovery configuration having information related to recovery, by a mobile device, from a link failure affecting a service associated with a first data flow established with the mobile device utilizing a first Radio Resource Control (RRC) connection with the mobile device, wherein the link recovery configuration comprises a list of network entities, wherein the information related to the recovery includes information related to establishing a second data flow utilizing a second RRC connection between the mobile device and another network entity from the list of network entities; and
        take action to configure the mobile device according to the link recovery configuration.

* * * * *